US012646343B2

(12) United States Patent
Ranftl et al.

(10) Patent No.: US 12,646,343 B2
(45) Date of Patent: Jun. 2, 2026

(54) METHODS AND APPARATUS TO PERFORM DENSE PREDICTION USING TRANSFORMER BLOCKS

(71) Applicant: Intel Corporation, Santa Clara, CA (US)

(72) Inventors: Rene Ranftl, Munich (DE); Alexey Bochkovskiy, Podolsk (RU); Vladlen Koltun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 584 days.

(21) Appl. No.: 17/855,763

(22) Filed: Jun. 30, 2022

(65) Prior Publication Data

US 2023/0113271 A1 Apr. 13, 2023

Related U.S. Application Data

(63) Continuation of application No. 17/485,349, filed on Sep. 25, 2021.

(51) Int. Cl.
*G06V 20/70* (2022.01)
*G06N 3/04* (2023.01)
(Continued)

(52) U.S. Cl.
CPC ............... *G06V 20/70* (2022.01); *G06N 3/04* (2013.01); *G06T 3/4046* (2013.01); *G06T 5/00* (2013.01);
(Continued)

(58) Field of Classification Search
CPC ..................... G06T 3/4046; G06T 5/00; G06T 2207/20016; G06T 2207/20021; G06T 2207/20084; G06T 2207/20221; G06N 3/04; G06N 3/045; G06N 3/048; G06V 10/82; G06V 20/70
See application file for complete search history.

(56) References Cited

U.S. PATENT DOCUMENTS

2022/0012848 A1    1/2022  Ranftl et al.
2022/0391635 A1*  12/2022  Lian ........................ G06N 3/045

OTHER PUBLICATIONS

Carion et al. "End-to end object detection with transformers." In Proc. Eur. Conf. Comp. Vis., 2020. (Year: 2020).*
(Continued)

*Primary Examiner* — Ross Varndell
(74) *Attorney, Agent, or Firm* — Akona IP PC

(57) ABSTRACT

Methods, apparatus, systems and articles of manufacture disclosed herein perform dense prediction of an input image using transformers at an encoder stage and at a reassembly stage of an image processing system. A disclosed apparatus includes an encoder with an embedder to convert an input image to a plurality of tokens representing features extracted from the input image. The tokens are embedded with a learnable position embedding. The encoder also includes one or more transformers configured in a sequence of stages to relate the tokens to each other. The apparatus further includes a decoder that includes one or more of reassemblers to assemble the tokens into feature representations, one or more of fusion blocks to combine the feature representations to generate a final feature representation, and an output head to generate a dense prediction based on the final feature representation and based on an output task.

21 Claims, 16 Drawing Sheets

(51) Int. Cl.
  *G06T 3/4046* (2024.01)
  *G06T 5/00* (2024.01)
(52) U.S. Cl.
  CPC .............. *G06T 2207/20016* (2013.01); *G06T 2207/20021* (2013.01); *G06T 2207/20084* (2013.01); *G06T 2207/20221* (2013.01)

(56) References Cited

OTHER PUBLICATIONS

Wang et al., "Pyramid Vision Transformer: A Versatile Backbone for Dense Prediction without Convolutions, " 2021 IEEE/CVF International Conference on Computer Vision (ICCV), Montreal, QC, Canada, 2021, pp. 548-558, doi: 10.1109/ICCV48922.2021.00061. (Year: 2021).*

Wu et al., "Fully Transformer Networks for Semantic Image Segmentation," https://arxiv.org/abs/2106.04108. (Year: 2021).*

Xu, Weijian et al. "Co-Scale Conv-Attentional Image Transformers." 2021 IEEE/CVF International Conference on Computer Vision (ICCV), Apr. 13, 2021 : 9961-9970. (Year: 2021).*

Xie, Enze, et al. "SegFormer: Simple and efficient design for semantic segmentation with transformers." Advances in neural information processing systems 34 (2021): 12077-12090. (Year: 2021).*

Lin, Tsung-Yi, et al. "Feature pyramid networks for object detection." Proceedings of the IEEE conference on computer vision and pattern recognition. 2017. (Year: 2017).*

Chen, Chun-Fu Richard, Quanfu Fan, and Rameswar Panda. "Crossvit: Cross-attention multi-scale vision transformer for image classification. " Proceedings of the IEEE/CVF international conference on computer vision. 2021. (Year: 2021).*

Strudel, Robin, et al. "Segmenter: Transformer for semantic segmentation." Proceedings of the IEEE/CVF international conference on computer vision. 2021. (Year: 2021).*

Rakhimov et al., "Latent Video Transformer," arXiv:2006.10704v1 [cs.CV], Jun. 18, 2020, retrieved from https://arxiv.org/pdf/2006.10704.pdf, 18 pages.

Touvron et al. "Training data-efficient image transformers & distillation through attention," International Conference on Machine Learning, PMLR, arXiv:2012.12877v2 [cs.CV], Jan. 15, 2021, 22 pages.

isl-org/DPT, "Dense Prediction Transformers," GitHub, Mar. 2021, retrieved from https://github.com/intel-isl/DPT, 4 pages.

Ranftl et al., "Vision Transformers for Dense Prediction," arXiv:2103.13413v1 [cs.CV], Mar. 24, 2021, retrieved from https://arxiv.org/abs/2103.13413, 15 pages.

Liu et al., "Swin transformer: Hierarchical vision transformer using shifted windows," Proceedings of the IEEE/CVF International Conference on Computer Vision, arXiv:2103.14030v2 [cs.CV], Aug. 17, 2021, 14 pages.

United States Patent and Trademark Office, "Non-Final Office Action," issued in connection with U.S. Appl. No. 17/485,349, dated Jan. 12, 2024, 16 pages.

Vaswani, A. et al. "Attention Is All You Need", 31st Conference on Neural Information Processing Systems (NIPS 2017), 11 pages. provided in parent U.S. Appl. No. 17/485,349.

Lin, G. et al. "RefineNet: Multi-path Refinement Networks for High-Resolution Semantic Segmentation", CVPR, 2017, pp. 1925-1934 (10 pages). provided in parent U.S. Appl. No. 17/485,349.

Dosovitskiy et al., "An image is worth 16x16 words: Transformers for image recognition at scale," In International Conference on Learning Representations, 2021. (Year: 2021).*

* cited by examiner

200B

Table 1. Comparison to the state of the art on monocular depth estimation. We evaluate zero-shot cross-dataset transfer according to the protocol defined in [30]. Relative performance is computed with respect to the original MiDaS model [30]. Lower is better for all metrics.

RESNEST-200 [51]

DPT-HYBRID

| Backbone | | pixAcc (%) | mIoU (%) |
|---|---|---|---|
| OCNet | ResNet101 | [50] | – | 45.45 |
| ACNet | ResNet101 | [14] | 81.96 | 45.90 |
| DeeplabV3 | ResNeSt-101 | [51, 7] | 82.07 | 46.91 |
| DeeplabV3 | ResNeSt-200 | [51, 7] | 82.45 | 48.36 |
| DPT-Hybrid | ViT-Hybrid | | 83.11 | 49.02 |
| DPT-Large | ViT-Large | | 82.70 | 47.63 |

Table 4. Semantic segmentation results on the ADE20K validation set.

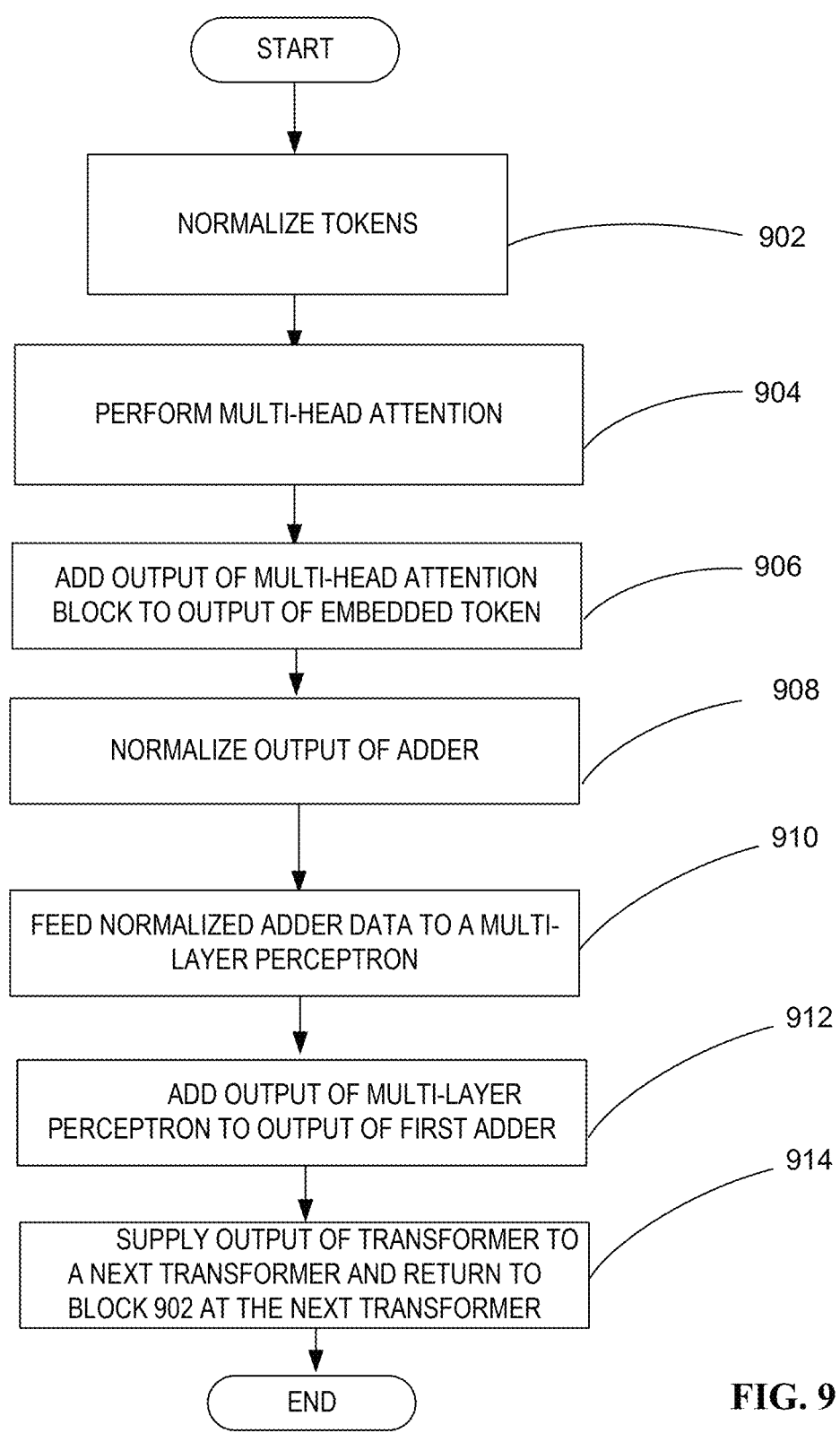

START

NORMALIZE TOKENS — 902

PERFORM MULTI-HEAD ATTENTION — 904

ADD OUTPUT OF MULTI-HEAD ATTENTION BLOCK TO OUTPUT OF EMBEDDED TOKEN — 906

NORMALIZE OUTPUT OF ADDER — 908

FEED NORMALIZED ADDER DATA TO A MULTI-LAYER PERCEPTRON — 910

ADD OUTPUT OF MULTI-LAYER PERCEPTRON TO OUTPUT OF FIRST ADDER — 912

SUPPLY OUTPUT OF TRANSFORMER TO A NEXT TRANSFORMER AND RETURN TO BLOCK 902 AT THE NEXT TRANSFORMER — 914

END

FIG. 9

START

READ TOKENS — 1002

RESHAPE TOKENS INTO IMAGE-LIKE
REPRESENTATION — 1004

RESAMPLE REPRESENTATION TO SCALE THE
REPRESENTATION — 1006

END

START

SUPPLY OUTPUT OF CONVOLUTIONAL UNITS TO BOTH ADDER AND FIRST RECTIFIED LINEAR UNIT — 1202

APPLY OUTPUT OF FIRST RECTIFIED LINEAR UNIT TO FIRST CONVOLUTIONAL UNIT — 1204

NORMALIZE BATCH OF OUTPUT DATA FROM CONVOLUTIONAL UNIT — 1206

REPEAT BLOCKS 1202-1206 USING THE OUTPUT GENERATED AT THE BLOCK 1206 ONCE — 1208

ADD DATA GENERATED AT BLOCK 422 TO RESIDUAL CONVOLUTIONAL UNIT — 1210

END

METHODS AND APPARATUS TO PERFORM DENSE PREDICTION USING TRANSFORMER BLOCKS

CROSS REFERENCE TO RELATED APPLICATION

This application is a continuation of (and claims the benefit of priority to) U.S. patent application Ser. No. 17/485,349, filed Sep. 25, 2021, entitled "METHODS AND APPARATUS TO PERFORM DENSE PREDICTION USING TRANSFORMER BLOCKS," now U.S. Pat. No. 12,380,714, which is hereby incorporated by reference in its entirety.

FIELD OF THE DISCLOSURE

This disclosure relates generally to dense prediction in computer vision, more particularly, to methods and apparatus to perform dense prediction using transformer blocks for improving dense prediction in computer vision.

BACKGROUND

Computer vision refers to computerized techniques that allow a computer system to gain a high-level understanding of digital images or videos. The high-level understanding can then be used to inform whether an action is to be taken/recommended. One aspect of computer vision, called dense prediction is commonly performed using fully-convolutional deep networks.

Dense prediction refers to the task of predicting a label (or labels) to be associated with every pixel in an image. For example, a semantic segmentation label identifies a class corresponding to what (e.g., building, sky, automobile, person, etc.) is being represented in an image. In addition, a depth estimation label identifies a distance between the image being processed and an observer of the image. Further, a keypoint detection label represents a likelihood that a pixel is a keypoint. Keypoint pixels occupy points in an image that are related to content in the image that is interesting (e.g., content that stands out). An optical flow label identifies an apparent motion of the pixel being labeled in a current frame relative to another frame.

BRIEF DESCRIPTION OF THE DRAWINGS

FIG. 9 is a flowchart representative of example machine readable instructions that may be executed by example processor circuitry to implement the set of transformer stages of the dense predictor of FIG. 1.

Figure 1:
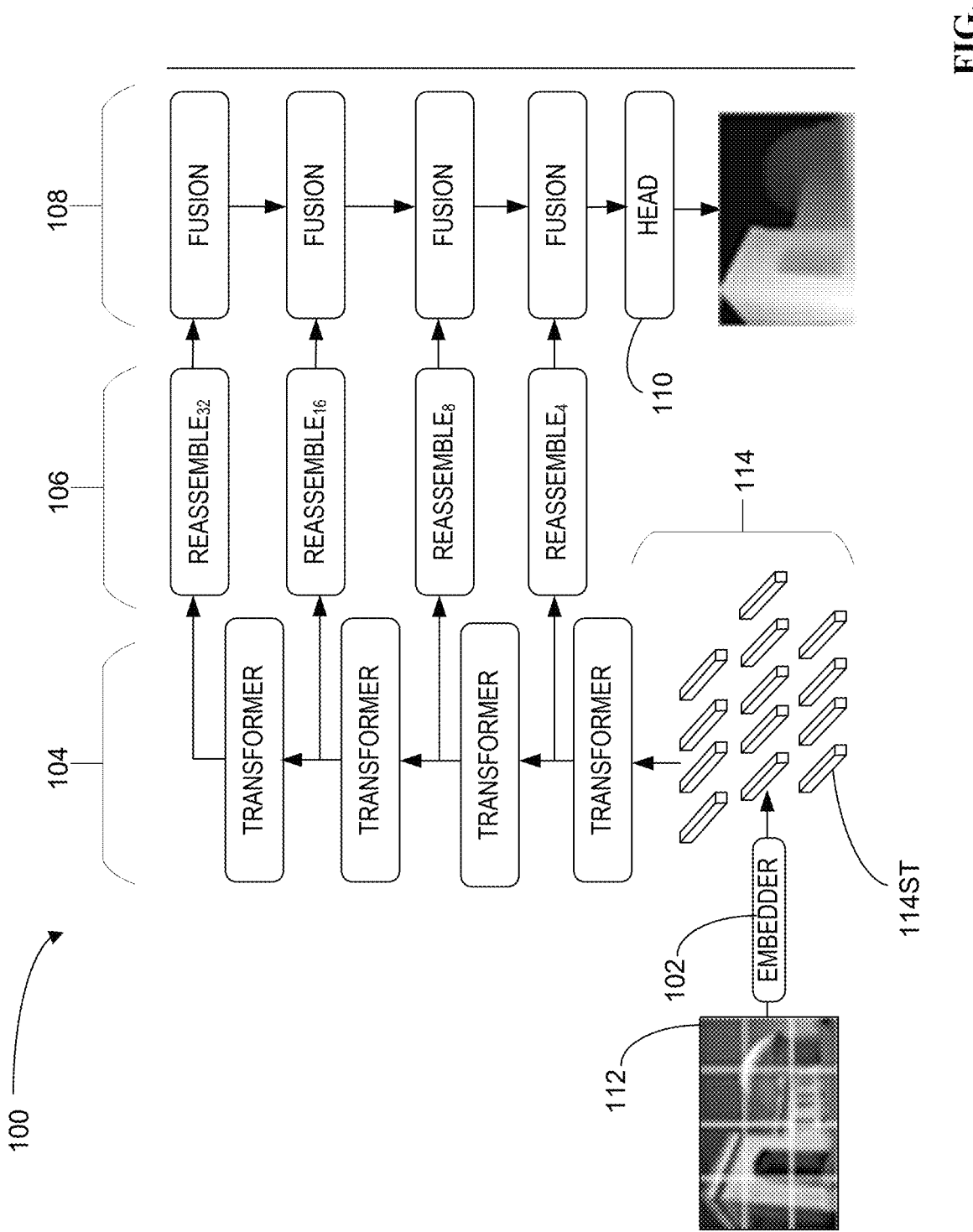
FIG. 1 is a block diagram of an image processing system to implement a dense predictor in accordance with the teachings disclosed herein.

The figures are not to scale. In general, the same reference numbers will be used throughout the drawing(s) and accompanying written description to refer to the same or like parts. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Dense prediction (the task of predicting/assigning labels to every pixel of an image) is an aspect of computer vision technology that is typically performed using some combination of convolution and subsampling. These fundamental elements are used to learn multi-scale representations of images that can leverage spatial context of the images. Example categories of such dense prediction techniques include techniques that: 1) progressively upsample representations that have been pooled at different stages, 2) use dilated convolutions to increase the receptive field, and 3) perform parallel multi-scale feature aggregation at multiple resolutions to increase the receptive field.

Unfortunately, encoders of fully-convolutional techniques progressively down-sample the input image to extract features at multiple scales. This act of down-sampling enables an increase of the receptive field, the grouping of low-level features into abstract high-level features, and simultaneously ensures that memory and computational requirements of the network remain tractable. However, down-sampling has distinct drawbacks that are particularly salient in dense prediction task. In particulate, down-sampling in dense prediction results in loss of feature resolution and granularity in the deeper stages of the dense prediction model and these aspects are hard to recover in a downstream decoder. Previous solutions to mitigate such losses in granularity are focused on the decoder.

In contrast, the methods, apparatus, systems, and articles of manufacture disclosed herein are based on an encoder-decoder design/architecture that leverages a vision transformer (ViT) as a basic computational building block of the encoder. A bag-of-words representation that is provided by the vision transformer is reassembled into image-like feature representations at various resolutions and the feature representations are progressively combined into the final dense prediction using a convolutional decoder.

Further, the methods, apparatus, systems, and articles of manufacture disclosed herein include an architecture that foregoes explicit down-sampling operations after an initial image embedding has been computed and that also maintains a representation with constant dimensionality throughout all image processing stages. Further, the architecture has a global receptive field (context) at every image processing stage.

These properties are especially advantageous for dense prediction tasks as such properties naturally lead to fine-grained and globally coherent predictions. Increased accuracy for dense prediction allows the building of higher quality products in various fields of technology (depth sensing, camera ISPs, autonomous driving, robotics).

FIG. 1 is a block diagram of an image processing system 100 in accordance with the teachings disclosed herein. In some examples, the example image processing system 100 includes an example image embedder 102, an example set of transformer stages 104, an example set of reassemblers 106, an example set of fusion modules 108, and, at the output of the system 100, a head 110.

In some examples, an input image 112 is transformed into tokens 114 by the image embedder 102. The input image 112 is transformed into tokens 112 by (1) extracting non-overlapping patches and then performing a linear projection of the flattened representation of the tokens or (2) applying a feature extractor implemented using a residual network (e.g., ResNet-50). In some examples, the embedding performed by the image embedder 102 is augmented with a positional embedding and a special toke 114ST (also referred to as a special patch-independent readout token) (as described further below).

In some examples, the tokens 114 are then passed through the example multiple transformer stages 104. Subsequently, the example reassemblers 106 reassemble the tokens 114 supplied by different ones of the transformer stages into image-like representations at multiple resolutions. In some examples, the reassemblers 106 reassemble the tokens into feature maps with l/s the spatial resolution of the progressively, fuse and upsample the image-like representations (e.g., the feature maps) to generate a fine-grained prediction (e.g., a dense prediction). In some examples, the example set of fusion modules 108 fuse the feature maps using residual convolutional units and then upsample the feature maps (as described further below).

The example image processing system 100 of FIG. 1 operates as an encoder/decoder that performs dense prediction. In some such examples, the example embedder 102 and the example set of transformer stages 104 operate together as an encoder. In addition, the example set of transformer 106, the example set of fusion blocks 108, and the head operate as a decoder.

Embedder

Figure 2A:
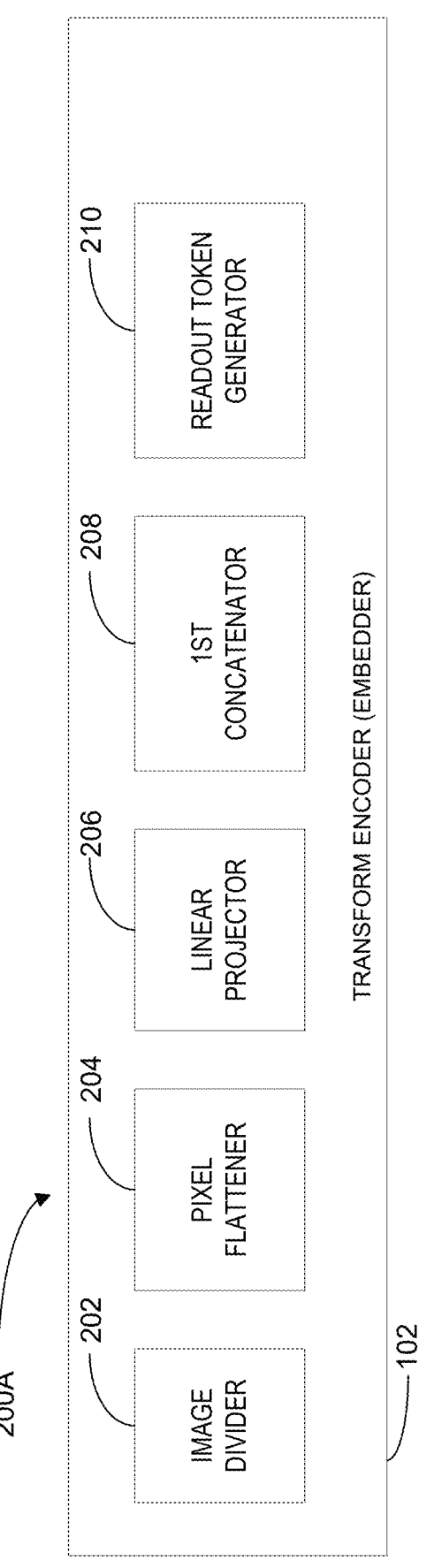
FIG. 2A is a block diagram of a transformer encoder/embedder of the dense predictor of FIG. 1.

FIG. 2A is a block diagram 200A of the example embedder 102 of FIG. 1. As described above in connection with FIG. 1, the example set of transformer encoder (also referred to as vision transformers ("ViTs")) operate on a bag-of-words representation of the image, much like a natural language processor operates. Image patches that are individually embedded into a feature space or, alternatively, deep features extracted from the image, take the role of "words". As used herein, the term "features" can also refer to deep features. In machine learning, a deep feature is the consistent response of a node or layer within a hierarchical model to an input that gives a response that is relevant to a final output of the model. One feature is considered "deeper" than another depending on how early in the decision tree or other framework the response is activated. As used herein, the embedded words are referred to as tokens.

In some examples, the example embedder 102 performs a patch embedding process on the image by processing all non-overlapping square patches of size $p^2$ pixels of the image. In some examples, the embedder 102 includes an example image divider 202, an example pixel flattener 204, an example linear projector 206, an example 1st concatenator 208, and an example readout token generator 210. The image divider 202 divides the image into non-overlapping patches and the pixel flattener 204 flattens the patches into vectors. Further, the linear projector 206 embeds the patches individually. Alternatively, in some examples, a more sample-efficient variant of the ViT extracts the embeddings by applying a residual network (e.g., ResNet50) to the image to obtains feature maps and then uses pixel features of the resulting feature maps as tokens.

As transformers are set-to-set functions, the embedder (which operates as a transformer) does not intrinsically retain spatial position information of individual tokens. Thus, the example first concatenator 208 concatenates the embeddings with a learning position embedding to add spatial positions to the image representation. The example readout token generator 210 generates a special token 114ST, also referred to as a readout token. The readout token is not grounded in the input image (e.g., is patch-independent) and serves as a final, global image representation to be used for classification. Thus, for example, applying the embedder to an image of size H×W pixels results in the generation of $t^0 = \{t0\ 0, \ldots, t0Np\}$, $t0\ n \in R\ D$ tokens, where $Np = HW\ p^2$, $t^0$ is the readout token 114ST, the variable D is the feature dimension of each token, and the variable R represents the set of real numbers.

In some examples, for illustrative purposes, a patch size "p" is assigned a value of 16. The embedding procedure for ViT-Base and ViT-Large projects the flattened patches (using the pixel flattener 204) to dimension D=768 and D=1024, respectively (these values of D are examples only). Generally, the network will learn better with larger values of D but will also require more computation resources. As both feature dimensions are larger than the number of pixels in an input patch, the embedding procedure can learn to retain information when such information is beneficial for the task. Using the ViT-Base and ViT-Large projects, features from the input patches "p" can be resolved with pixel-level accuracy. Similarly, the ViT-Hybrid architecture extracts features at $\frac{1}{16}$ the input resolution, which is twice as high as the lowest-resolution features that are commonly used with convolutional network backbones. Thus, improving the recovery of the features at the decoder (where the decoder is implemented with the example set of reassemblers and fusion blocks.

Applying the Tokens to the Transformers

In some examples, the tokens are supplied to the set of transformer stages 106. In some examples, the set of transformer stages includes L stages (e.g., L transformers). The tokens are transformed using the set of L transformer stages 104 (See FIG. 1) into new representations t', where l refers to the output of the l-th transformer stage. In some examples, three different variants of transformer stages can be used.

Figure 2B:
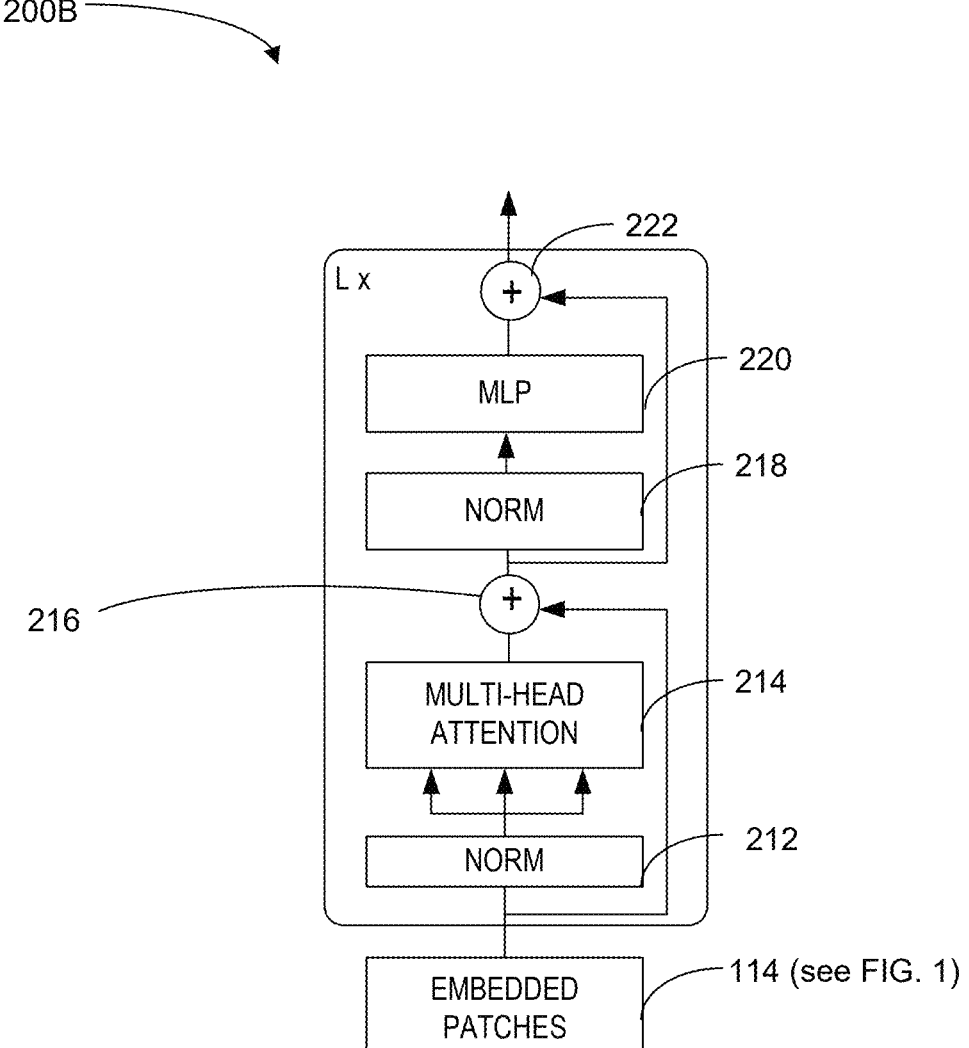
FIG. 2B is a block diagram of one transformer stage in a set of transformer stages of the dense predictor of FIG. 1.

FIG. 2B is a block diagram of one of the example transformers 200B included in the example set of transformer stages. All of the transformers 200B have the same components that perform the same operations. In some examples, the transformer 200B includes an example first normalizer 212, an example multi-headed attention block 214, an example first adder 216, an example second normalizer 218, an example multi-layer perceptron 220 and an example second adder 222. The first normalizer 212 of the first transformer 200B of the set of transformer stages 104 (see FIG. 1) normalizes the set of tokens generated by the example embedder 102 (see FIG. 1). The multi-head attention block 214 then performs multi-head attention on the normalized tokens. The first adder 216 adds the output of the multi-head attention block 214 and the embedded patches/tokens 114 generated by the embedder 102. The added information is then fed to the second normalizer 218 and is also fed to the second adder 222. The input data to the second normalizer is normalized and then supplied to the multi-layer perceptron 220. The output of the multi-layer perceptron 220 is supplied to the second adder 222 where the output is added to the output of the first adder 216. The output of the transformer 220B is supplied to the next transformer 220B of the set of transformer stages 104 and is also supplied to a corresponding one of the example reassemblers 106 (see FIG. 1).

An example first variant, referred to as a ViT base variant, uses the patch-based embedding procedure performed by the embedder 102 and features 12 transformer stages (e.g., L=12). An example second variant, referred to as a ViT-Large variant, also uses the patch-based embedding procedure performed by the embedder 102 has 24 transformer stages (L–24) and a wider feature size D. As used herein, the variable "D" represents the dimension after the flattened tokens are projected by the linear projector 206. An example third variant, referred to as a ViT-Hybrid variant, employs a residual network (e.g., ResNet50) to perform an image embedding process followed by 12 transformer stages.

Thus, the operation of each of the example transformers 200B relates each token to all of the other tokens. In addition, each transformer stage maintains the same number of tokens throughout all computations. As tokens have a one-to-one correspondence with image patches, the ViT encoder maintains the spatial resolution of the initial embedding process performed by the embedder 102 (see FIG. 1) throughout all transformer stages (e.g., throughout all stages of the set of transformers 104). Additionally, the multi-head self-attention operations are inherently global, as every token attends to and influences every other token. A global receptive field exists at every processing stage after the initial embedding.

Figure 3:
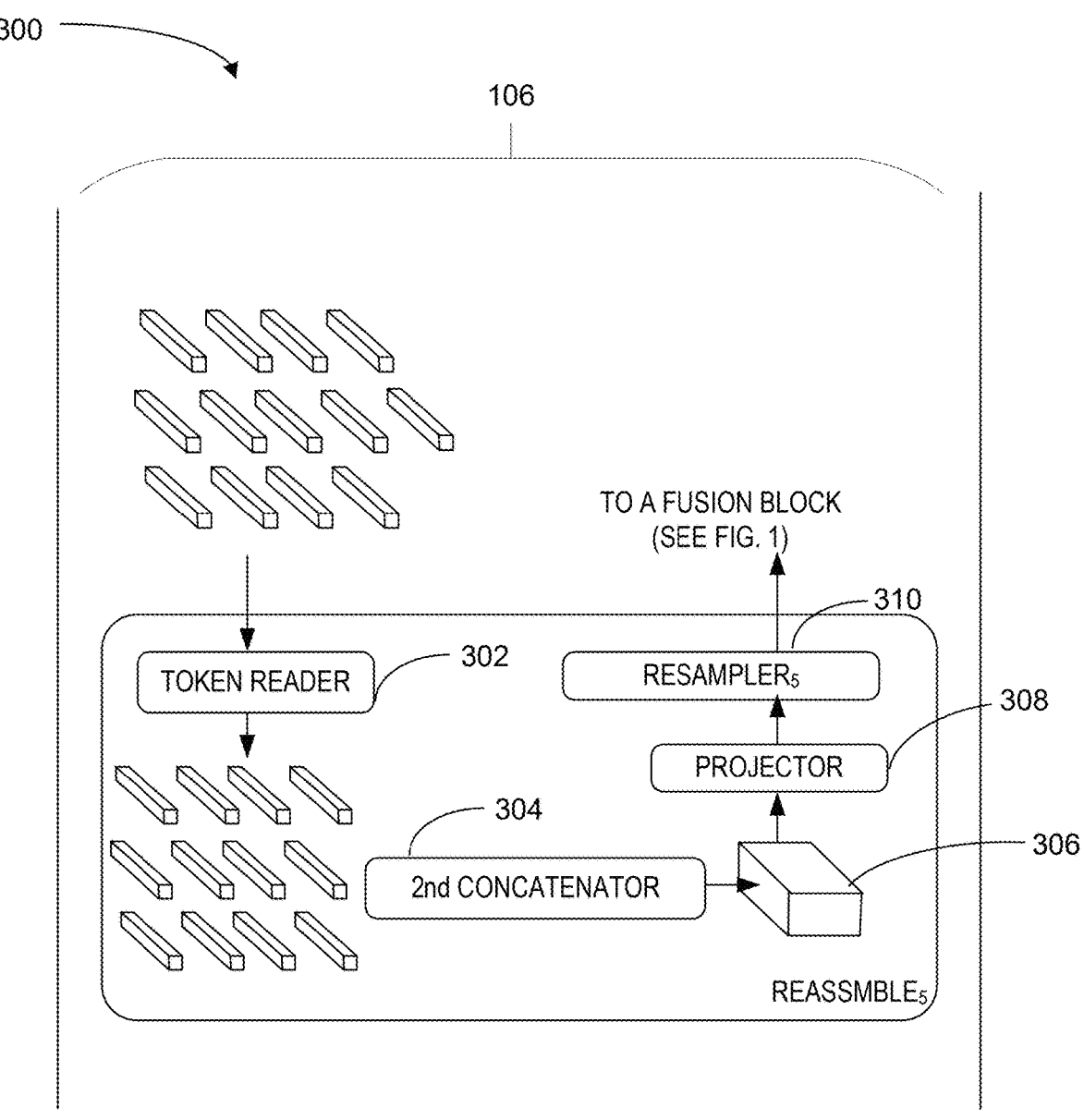
FIG. 3 is block diagram of a reassembler of the dense predictor of FIG. 1.

FIG. 3 is a block diagram 300 of one of the example set of assemblers 106 of FIG. 1. As described above with respect to FIG. 1, the set of assemblers, the example fusion blocks 108 and the example head 110 operate as a decoder. In operation, the assemblers 106 assemble the set of tokens 114 into image-like feature representations at various resolutions and the set of fusion blocks progressively fuses the feature representations into a final dense prediction.

In some examples, each of the reassemblers included in the set reassemblers 106 includes an example token reader 302, an example second concatenator 304, an example storage 306, an example projector 308, and an example resampler 310. As an overview, the components of the reassemblers operate to perform a three stage operation to recover image-like representations from the output tokens of arbitrary layers of the set of transformer stages 104.

In some examples, the three stage operation performed by each of the reassemblers 106 can be represented as an evaluation of a variable "t" over an interval spanning from "D'" to "s," where the evaluation is calculated by multiplying the results of a "Resample operation," a "Concatenate operation," and a "Read operation" for each value of "(t)". In some examples, the variable "s" denotes the output size ratio of the recovered representation with respect to the input image, and the variable "D'" denotes a number of channels. For example, a high dimensional image can have a spatial dimension represented by M×N and D channels (unlike a normal image that has three channels (e.g., Red, Green and Blue).

In some examples, the decoder (e.g., the example set of assemblers 106, the example set of fusion blocks 108, and the example head 110) maps "$N_p$+1" tokens to a set of $N_p$ tokens that is amenable to spatial concatenation into an image-like representation. The mapping is represented as "Read:R $N^{p+1 \times D} \to R^{Np \times D}$."

The mapping operation takes one of three actions (also referred to as variants) dependent on the goal of the image processing system. For example, the readout token 114ST does not serve a clear purpose for the task of dense prediction, but can, in some examples, be useful to capture and distribute global information. The three different variants of the mapping are evaluated including (1) Readignore(t)= {t1, . . . , tNp} which ignores the readout token 114ST, (2) Readadd(t)={t1+t0, . . . tNp+t0} which passes the information from the readout token 114ST to all other tokens by adding the representations, and (3) Readproj (t)={mlp(cat $(t_1, t_0)), \ldots, mlp(cat(t_{Np}, t_0))$} which passes information to the other tokens by concatenating the readout to all other tokens before projecting the representation to the original feature dimension D using a linear layer followed by a Gaussian Error Linear Units non-linearity.

In some examples, after the operation of the example token reader 302 (e.g., "Read:R $N^{p+1 \times D} \to R^{Np \times D}$"), the resulting $N_p$ tokens can be reshaped into an image-like representation by placing each token according to the position of the initial patch in the image. In some examples, the tokens are reshaped into an image-like representation. In some such examples, the $2^{nd}$ concatenator 304 applies a spatial concatenation operation that results in a feature map of size H/p×W/p with D channels. The operation performed by the example concatentor 304 can be represented as "$R^{Np \times D} \to R^{H/p \times W/p \times D}$," and results in an image-like representation which can temporarily held in storage 306. The resulting image like representation (also called a feature representation) is passed to the example resampler 310 which scales the representation to size H/s×W/s with $D^{\wedge}$ features per pixel. The features represent a more abstract representation of the input image. The resampling operation performed by the resampler 310 can be represented "$R^{H/p \times W/p \times D} \to R^{H/s \times W/s \times D^{\wedge}}$."

Figures 4A, 4B:
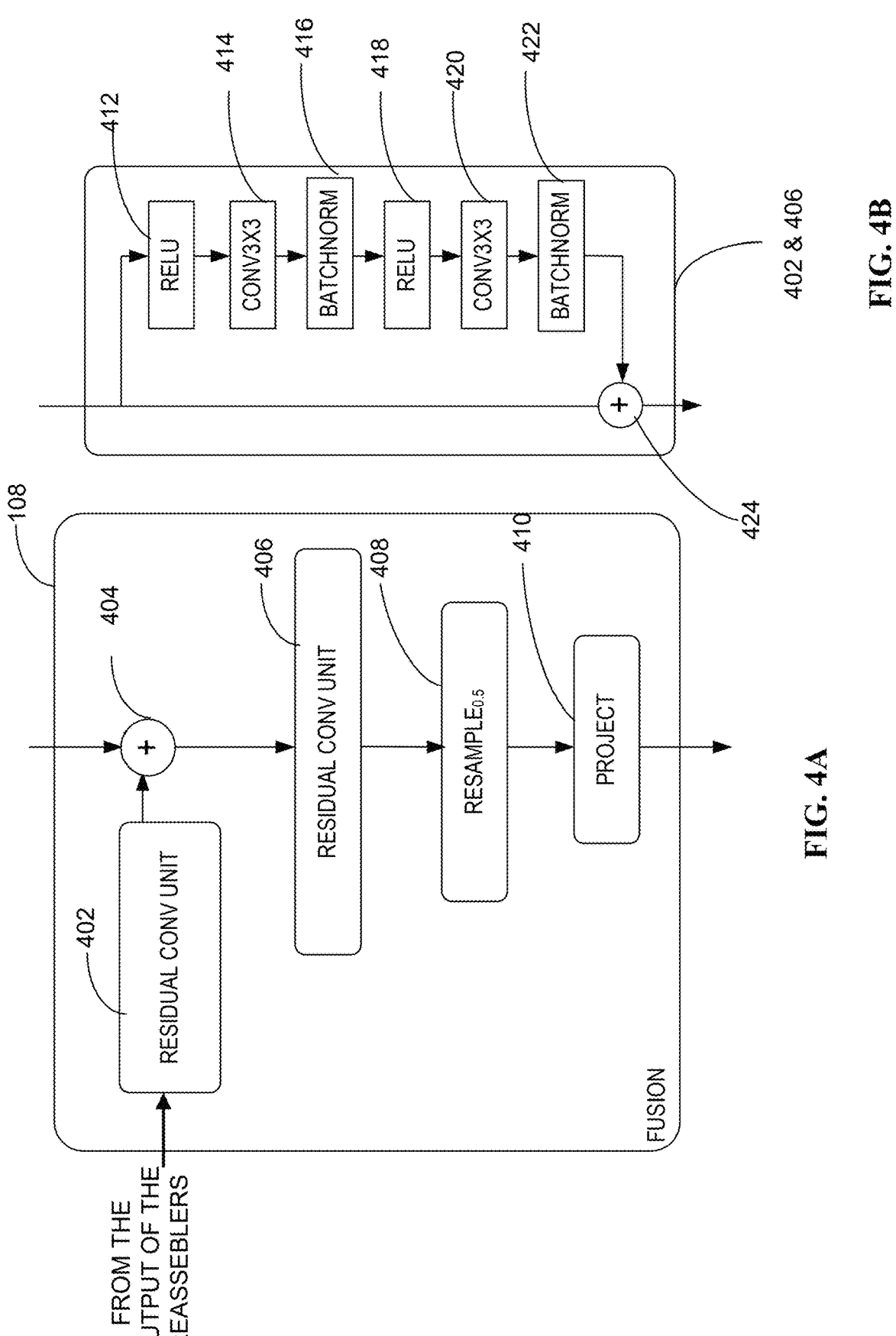
FIG. 4A is a block diagram of a fusion module of the dense predictor of FIG. 1.
FIG. 4B is a block diagram of a residual convolutional network.

FIG. 4A is a block diagram of the one of the example fusion blocks 108 of the set of fusion blocks 108 of FIG. 1. In some examples, the fusion block 108 includes an example first residual convolutional unit 402, an example adder 404, an example second residual convolutional unit 406, an example resampler 408, and an example projector 410. In some examples, the output of the assembler 106 is supplied to an input fusion block 108 where it is operated on by the first residual convolutional unit 402. The adder 404 adds the output of the first convolutional unit 420 to the output of an earlier fusion 108 (not shown). The second residual convolutional unit 406 operates on the output of the adder 404. The output of the second residual convolutional unit 406 supplies the results to the resampler$_{0.5}$ and the resampled data is then projected by the projector 410.

FIG. 4B is a block diagram of the example first and second residual convolutional units 402, 406. In some each of the first and second residual convolutional units 402, 406 include an example first rectified linear unit 412, an example 3×3 convolution 414, an example first batch normalizer 416, an example second rectified linear unit 418, an example strided 3×3 transpose convolution 420, and an example second batch normalizer 422 and an example adder 424. In some examples, the input supplied to the residual convolutional units 402, 406 is provided to both the example adder 424 and to the first rectified linear unit 412. The output of the first rectified linear unit 412 is supplied to the example first convolutional unit (3×3) 414 and is then normalized by the first batch normalizer 416. Thereafter the operations of blocks 412-416 are repeated by the blocks 418, 420, and 422, respectively. The output of the second normalizer 422 is supplied to the adder 424 for addition to the input data set.

The resampler network operates by first using the example projector 308 to use 1×1 convolutions to project the input representation to $D^{\wedge}$, followed by a (strided) 3×3 convolution when s≥p, or a strided 3×3 transpose convolution when s<p to thereby implement both spatial downsampling and upsampling operations, respectively.

Irrespective of the transformer backbone used in the image processing system, the features are reassembled at the set of reassemblers 106 at a set of resolutions equal to the number of reassemblers included in the set. In some examples, the set includes four reassemblers to produce four different resolutions. In some examples, the features are assembled from deeper layers of the transformer at a lower resolution, whereas features from early layers are assembled at a higher resolution.

Thus, in some examples, when using ViT-Large, the tokens are reassembled using layers l={6, 12, 18, 24}, and when using ViT-Base, the tokens are reassembled using layers l={3, 6, 9, 12}. When ViT-Hybrid is employed the features from the first and second residual network block (e.g., from the embedding network) and stages l={9, 12} are used. Some example architectures use projection as the readout operation and thereby produce feature maps with $D^{\wedge}$=256 dimensions. These architectures are referred to as DPT-Base, DPT-Large, and DPT-Hybrid, respectively In some examples, the extracted feature maps from consecutive stages are combined using a RefineNet-based feature fusion block and the feature representations (maps) are progressively upsampled by a factor of two in each fusion stage. The final representation size has half the resolution of the input image. A task-specific output head (e.g., the head 110 of FIG. 1) is attached to produce the final prediction. In some examples, the head 110 produces a final result (e.g., semantics, depth, etc.) from the abstract representation that is encoded in the feature images.

Handling varying image sizes. Akin to fully-convolutional networks, DPT can handle varying image sizes. As long as the image size is divisible by p, the embedding procedure can be applied and will produce a varying number of image tokens Np. As a set-to-set architecture, the transformer encoder can trivially handle a varying number of tokens. However, the position embedding has a dependency on the image size as it encodes the locations of the patches in the input image. The position embedding are linearly interpolated to the appropriate size, which can be performed on the fly. After the embedding procedure and the transformer stages, both the reassemble and fusion modules can trivially handle a varying number of tokens, provided that the input image is aligned to the stride of the convolutional decoder (32 pixels). That is to say, provided that the side/ side length in pixels of the input has to be divisible by 32.

Figures 5A, 5B:
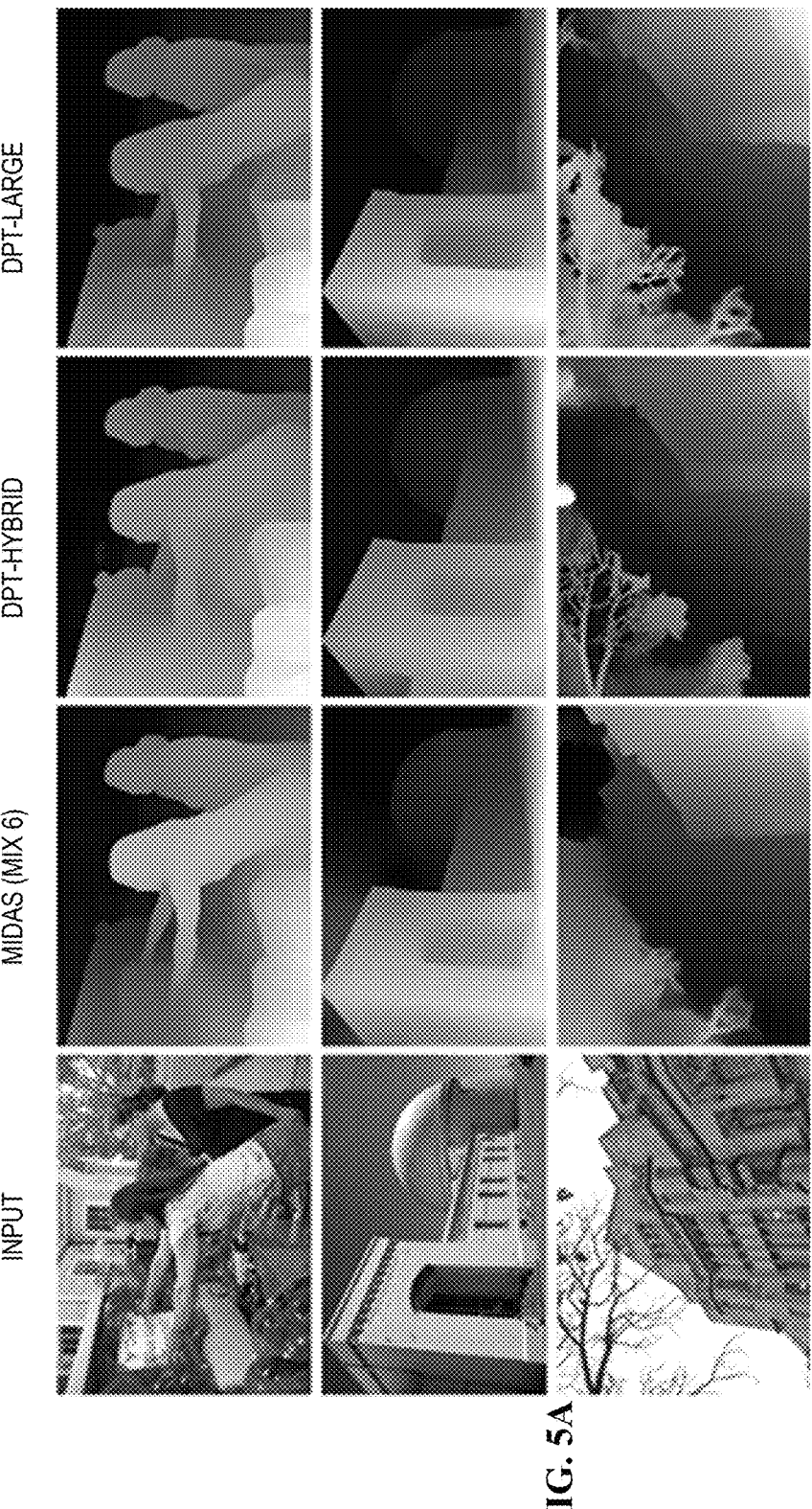
FIG. 5A is a set of dense predictions of an input image and images that show corresponding monocular depth estimations using the dense predictor of FIG. 1 compared to an MiDaS fully convolutional architecture.
FIG. 5B is a table illustrating numerical comparisons of monocular depth estimations generated using the dense predictor of FIG. 1 and generated using the state-of-the-art in monocular depth estimation.

FIG. 5A is a set of images illustrating the improvements gained by using encoder decoder image processing system 100 of FIG. 1 over other techniques to perform monocular depth estimation. FIG. 5B is a table summarizing numerical comparisons to the state-of-the-art in monocular depth estimation. A significant increase in accuracy of the proposed architectures (DPT-Large and DPT-Hybrid) is observed over the previous state-of-the-art (MiDaS) fully-convolutional architecture.

Figures 6A, 6B:
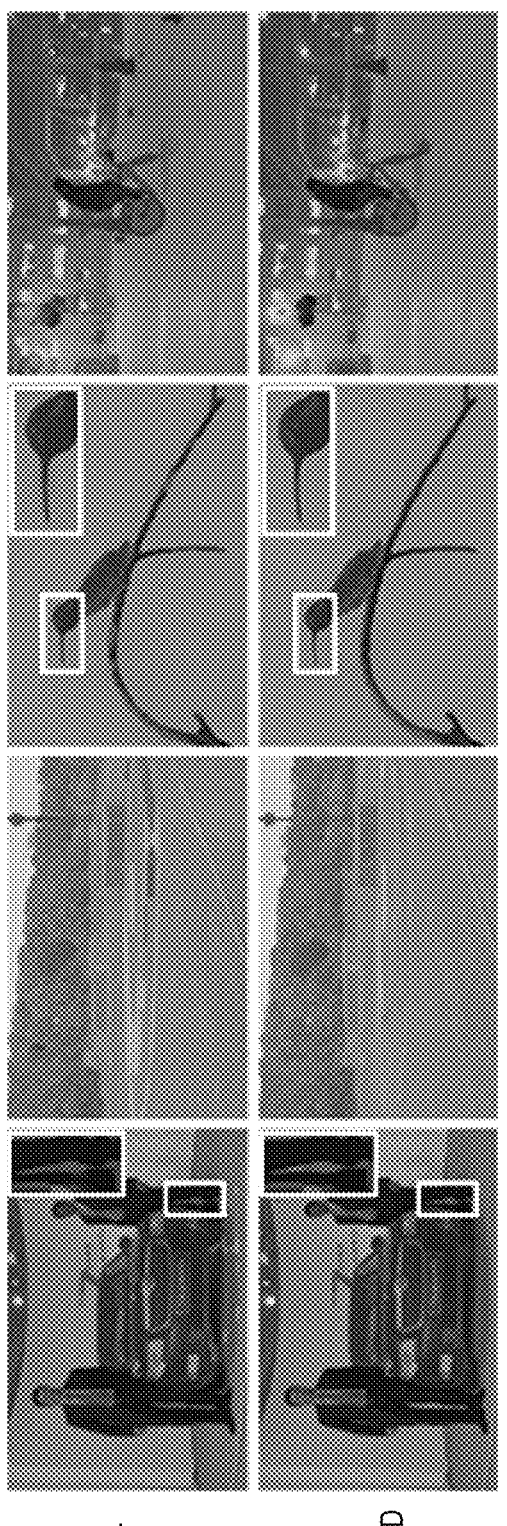
FIG. 6A is a set of dense predictions of an input image and images that show corresponding semantic segmentation estimations generated using the dense predictor of FIG. 1 and using other prediction techniques.
FIG. 6B is a table illustrating numerical comparisons of semantic segmentation generated using the dense predictor of FIG. 1 and generated using other prediction techniques.

FIG. 6A is a set of images illustrating the improvements gained by using the disclosed encoder decoder image processing system 100 of FIG. 1 over other techniques to perform semantic segmentation. FIG. 6B is a table showing a comparison to the state-of-the-art in semantic segmentation. Again, accuracy improvements can be seen when using the proposed architecture (e.g., system 100) of FIG. 1.

In some examples, the image processing system includes means for converting an input image into a plurality of token representing features extracted from the input image. For example, the means for converting may be implemented by the embedder 102 of FIG. 1 and FIG. 2. In some examples, the embedder 102 may be implemented by machine executable instructions such as that implemented by at least blocks 802-808 of FIG. 8 executed by processor circuitry, which may be implemented by the example processor circuitry 1300 of FIG. 13, the example processor circuitry 1400 of FIG. 14, and/or the example Field Programmable Gate Array (FPGA) circuitry 1500 of FIG. 15. In other examples, the embedder 102 is implemented by other hardware logic circuitry, hardware implemented state machines, and/or any other combination of hardware, software, and/or firmware. For example, the embedder 102 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for converting include means for dividing an input image. For example, the means for dividing may be implemented by the image divider 202 of FIG. 2. In some examples, the means for dividing 202 may be implemented by machine executable instructions such as that implemented by at least blocks 802 of FIG. 8 executed by processor circuitry, which may be implemented by the example processor circuitry 13 of FIG. 13, the example processor circuitry 1400 of FIG. 14, and/or the example Field Programmable Gate Array (FPGA) circuitry 1500 of FIG. 15. In other examples, the means for dividing 202 is implemented by other hardware logic circuitry, hardware implemented state machines, and/or any other combination of hardware, software, and/or firmware. For example, the means for dividing 102 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for converting include means for means for concatenating a learning position. For example, the means for concatenating a learning position may be implemented by the example first concatenator 208 of FIG. 2. In some examples, the means for concatenating may be implemented by machine executable instructions such as that implemented by at least block 802 of FIG. 8 executed by processor circuitry, which may be implemented by the example processor circuitry 13 of FIG. 13, the example processor circuitry 1400 of FIG. 14, and/or the example Field Programmable Gate Array (FPGA) circuitry 1500 of FIG. 15. In other examples, the means for concatenating is implemented by other hardware logic circuitry, hardware implemented state machines, and/or any other combination of hardware, software, and/or firmware. For example, the means for concatenating 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image processing system includes means for reassembling which can include means for reading a token, means for spatially concatenating an output of a token reader to generate a feature representation (also called feature map), and means for scaling the feature representation. For example, the means for reassembling which can include means for reading a token, means for spatially concatenating an output of a token reader to generate a feature representation (also called feature map), and means for scaling the feature representation may be implemented by the reassember 106 of FIG. 1, the token reader 302, the second concatenator 304 and the resampler 310, respectively. In some examples, the means for reassembling which can include means for reading a token, means for spatially concatenating an output of a token reader to generate a feature representation (also called feature map), and means for scaling the feature representation may be implemented by machine executable instructions such as that implemented by at least blocks 1002-1006 of FIG. 10 executed by processor circuitry, which may be implemented by the example processor circuitry 1300 of FIG. 13, the example processor circuitry 1400 of FIG. 14, and/or the example Field Programmable Gate Array (FPGA) circuitry 1500 of FIG. 15. In other examples, the means for reassembling which can include means for reading a token, means for spatially concatenating an output of a token reader to generate a feature representation (also called feature map), and means for scaling the feature representation is implemented by other hardware logic circuitry, hardware implemented state machines, and/or any other combination of hardware, software, and/or firmware. For example, the means for reassembling which can include means for reading a token, means for spatially concatenating an output of a token reader to generate a feature representation (also called feature map), and means for scaling the feature representation may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the image processing system 100 to perform dense prediction (see FIG. 1) is illustrated in FIGS. 2A, 2B, 3, and 4 one or more of the elements, processes, and/or devices illustrated in FIGS. 2A, 2B, 3, and 4 may be combined, divided, re-arranged, omitted, eliminated, and/or implemented in any other way. Further, the example embedder 102, the example image divider 202, the example pixel flattener 204, the example linear projector 206, the example 1st concatenator 208, the example readout token generator 210, the example transformer 200B the example first normalizer 212, the example multi-headed attention block 214, the example first adder 216, the example second normalizer 218, the example multi-layer perceptron 220, the example second adder 222, the example reassembler 106, the example token reader 302, the example second concatenator 304, the example storage 306, the example projector 308, and the example resampler 310, the example fusion block 108, the example first residual convolutional unit 402, the example adder 404, the example second residual convolutional unit 406, the example resampler 408, the example projector 410, the example first and second residual convolutional units 402, 406, the example first rectified linear unit 412, the example 3×3 convolution 414, the example first batch normalizer 416, the example second rectified linear unit 418, the example strided 3×3 transpose convolution 420, the example second batch normalizer 422, and the example adder 424, may be implemented by hardware alone or by hardware in combination with software and/or firmware. Thus, for example, any of the example embedder 102, the example image divider 202, the example pixel flattener 204, the example linear projector 206, the example 1st concatenator 208, the example readout token generator 210, the example transformer 200B the example first normalizer 212, the example multi-headed attention block 214, the example first adder 216, the example second normalizer 218, the example multi-layer perceptron 220, the example second adder 222, the example reassembler 106, the example token reader 302, the example second concatenator 304, the example storage 306, the example projector 308, and the example resampler 310, the example fusion block 108, the example first residual convolutional unit 402, the example adder 404, the example second residual convolutional unit 406, the example resampler 408, the example projector 410, the example first and second residual convolutional units 402, 406, the example first rectified linear unit 412, the example 3×3 convolution 414, the example first batch normalizer 416, the example second rectified linear unit 418, the example strided 3×3 transpose convolution 420, the example second batch normalizer 422, and the example adder 424, and/or more generally, the example image processing system of FIG. 1, could be implemented by processor circuitry, analog circuit (s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example image processing system 100 of FIG. 1 may include one or more elements, processes, and/or devices in addition to, or instead of, those illustrated in FIGS. 2A, 2B, 3, and 4, and/or may include more than one of any or all of the illustrated elements, processes and devices.

Flowcharts representative of example hardware logic circuitry, machine readable instructions, hardware implemented state machines, and/or any combination thereof for implementing the image processing system 100 of FIG. 1 and/or ones of the components of the image processing system of FIGS. 2A, 2B, 3, 4A, and 4B are shown in FIGS. 7-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry 1312 discussed below in connection with FIGS. 14 and/or 15. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7-12, many other methods of implementing the example image processing system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 7:
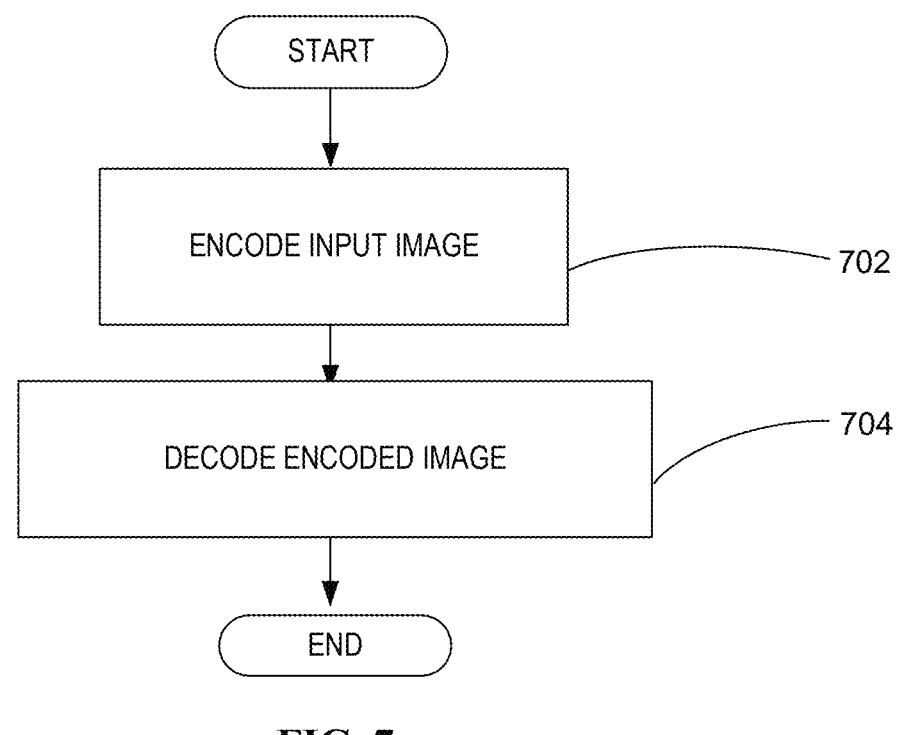
FIG. 7 is a flowchart representative of example machine readable instructions that may be executed by example processor circuitry to implement the dense predictor of FIG. 1.

FIG. 7 is a flowchart representative of example machine readable instructions and/or example operations 700 that may be executed and/or instantiated by processor circuitry to perform dense prediction. The machine readable instructions and/or operations 700 of FIG. 7 begin at block 702 at which the example embedder 102 (see FIG. 1) and the example set of transformer stages 104 (see FIG. 1) operate together to encode an input image. At a block 704, the example set of reassemblers 106 (see FIG. 1), the example set of fusion blocks 108 (see FIG. 1), and the head 110 (see FIG. 1) operate to decode the encoded image to form a final dense prediction. After the block 704, the operations and/or instructions of the flowchart end.

Figure 8:
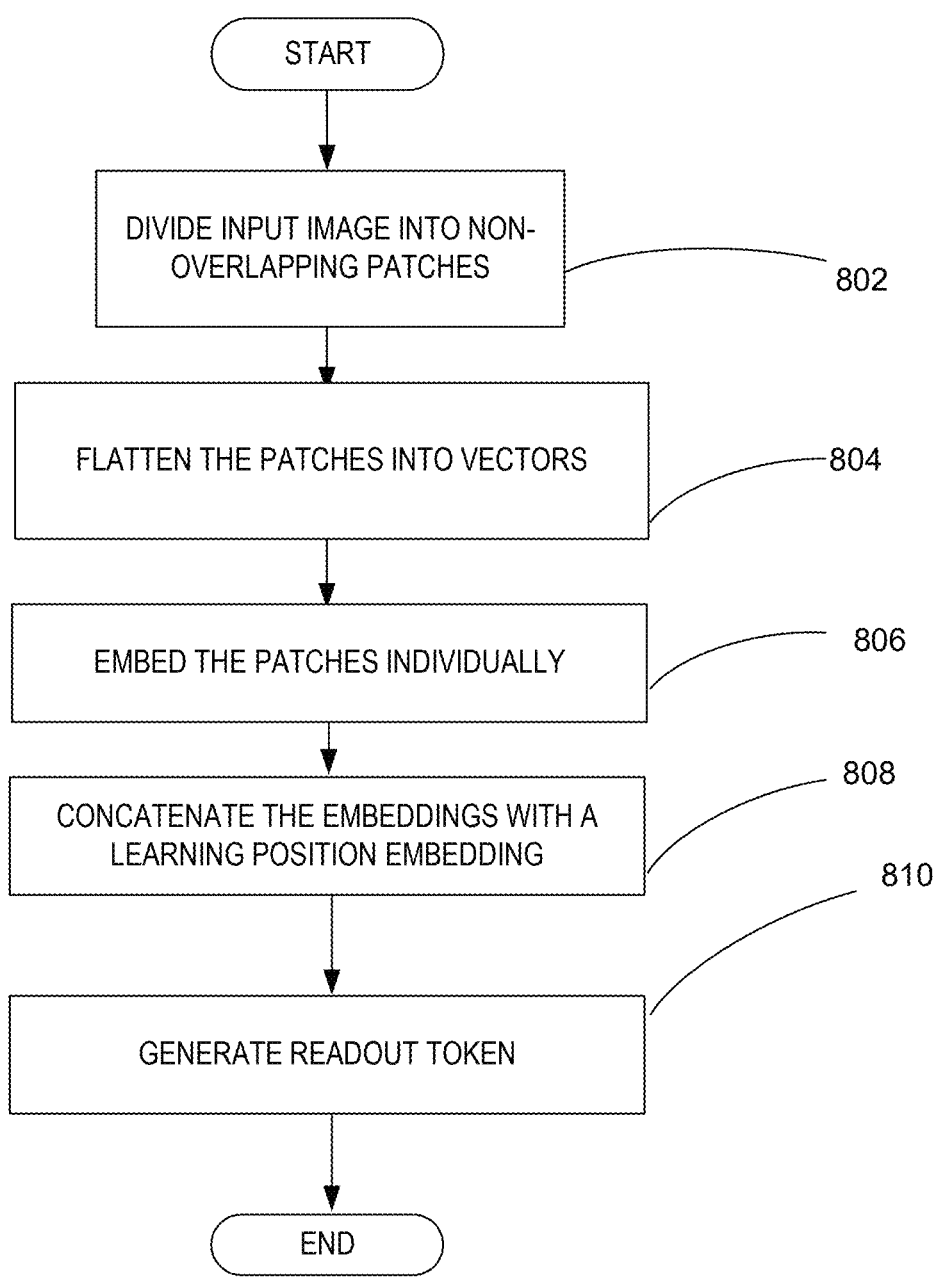
FIG. 8 is a flowchart representative of example machine readable instructions that may be executed by example processor circuitry to implement the embedder of the dense predictor of FIG. 1.

FIG. 8 is a flowchart is representative of example machine readable instructions and/or example operations 800 that may be executed and/or instantiated by processor circuitry to create the tokens/embeddings based on an input image. The machine readable instructions and/or operations 800 of FIG. 8 begin at block 802, at which the example image divider 202 (see FIG. 2) divides the image into non-overlapping patches. At a block 804, the example pixel flattener 204 (see FIG. 2) flattens the patches into vectors. At a block 806, the linear projector 206 (see FIG. 2) embeds the patches individually. At a block 808, the example first concatenator 208 concatenates the embeddings with a learning position embedding to add spatial positions to the image representation. At a block 810, the example readout token generator 210 generates the readout token (also referred as the special token and/or the patch-independent token 114 ST of FIG. 1). Thereafter the program/operations of the flowchart end. In some examples, the operations are performed by the components as described in connection with FIG. 2.

FIG. 9 is a flowchart is representative of example machine readable instructions and/or example operations 900 that may be executed and/or instantiated by processor circuitry to transform the tokens. At a block 902, the first normalizer 212 of the first transformer 200B of the set of transformer stages 104 (see FIG. 1) normalizes the set of tokens generated by the example embedder 102 (see FIG. 1). At a block 904, the multi-head attention block 214 performs multi-head attention on the normalized tokens. At a block 906, the first adder 216 adds the output of the multi-head attention block 214 to the embedded patches/tokens 114 generated by the embedder 102. At a block 908, the added data is normalized and then, at a block 910, is supplied to the multi-layer perceptron 220 which operates as a feedforward artificial neural network (or a network composed of multiple layers of perceptrons (with threshold activation). At a block 912, the output of the multi-layer perceptron 220 is supplied to the second adder 222 where it is added to the output of the first adder 216. Lastly, at a block 912, the output of the transformer 220B is supplied to a next one of the transformers 220B of the set of transformer stages 104 and is also supplied to a corresponding one of the example reassemblers 106 (see FIG. 1). Thereafter the method/operations/program instructions of flowchart of FIG. 9 ends.

Figure 10:
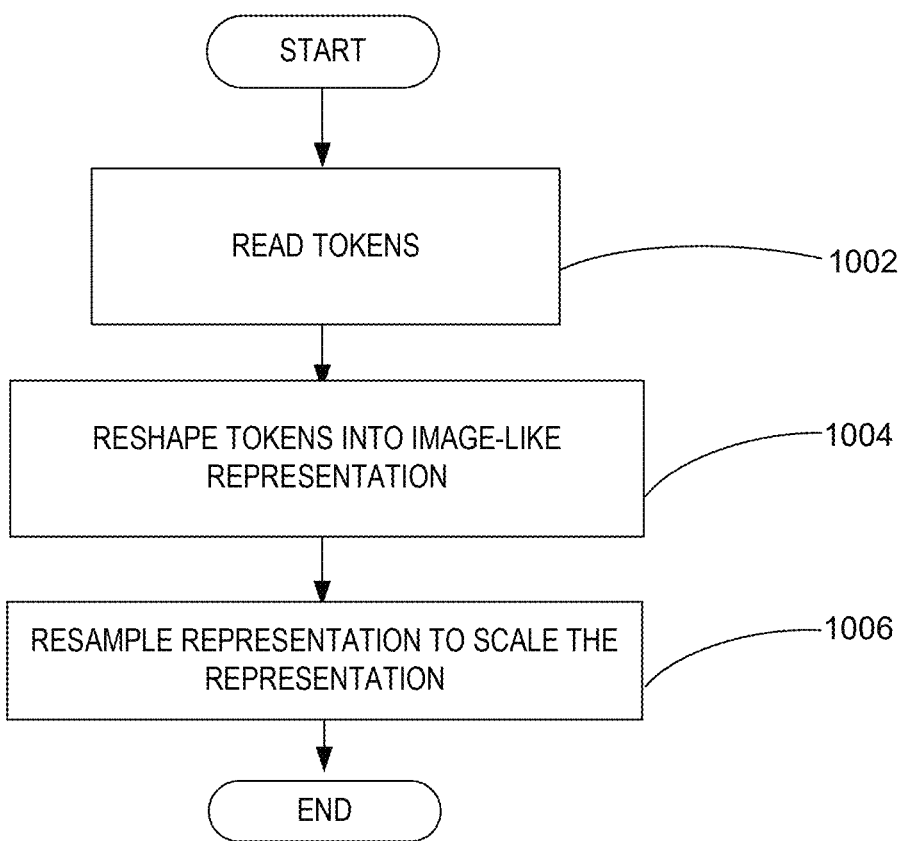
FIG. 10 is a flowchart representative of example machine readable instructions that may be executed by example processor circuitry to implement the reassemblers of the dense predictor of FIG. 1.

FIG. 10 is a flowchart is representative of example machine readable instructions and/or example operations 1000 that may be executed and/or instantiated by processor circuitry to reassemble the transformed tokens. At a block 1002, the example token reader 302 (see FIG. 3) performs a read operation on the tokens (e.g., "Read:R $N^{p+1 \times D} \rightarrow R^{Np \times D}$"). At a block 1004, the resulting $N_p$ tokens can be reshaped into an image-like representation by placing each token according to the position of the initial patch in the image. In some examples, the tokens are reshaped into an image-like representation. In some such examples, the $2^{nd}$ concatenator 304 applies a spatial concatenation operation that results in a feature map of size H/p×W/p with D channels. The operation performed by the example concatentor 304 can be represented as "$R^{Np \times D} \rightarrow R^{H/p \times W/p \times D}$," and results in an image-like representation which can temporarily held in storage 306. At a block 1006, the resulting image like representation is passed to the example resampler 310 which scales the representation to size H/s×W/s with D^ features per pixel. The features represent a more abstract representation of the input image. The resampling operation performed by the resampler 310 can be represented "$R^{H/p \times W/p \times D} \rightarrow R^{H/s \times W/s \times D}$".

Figure 11:
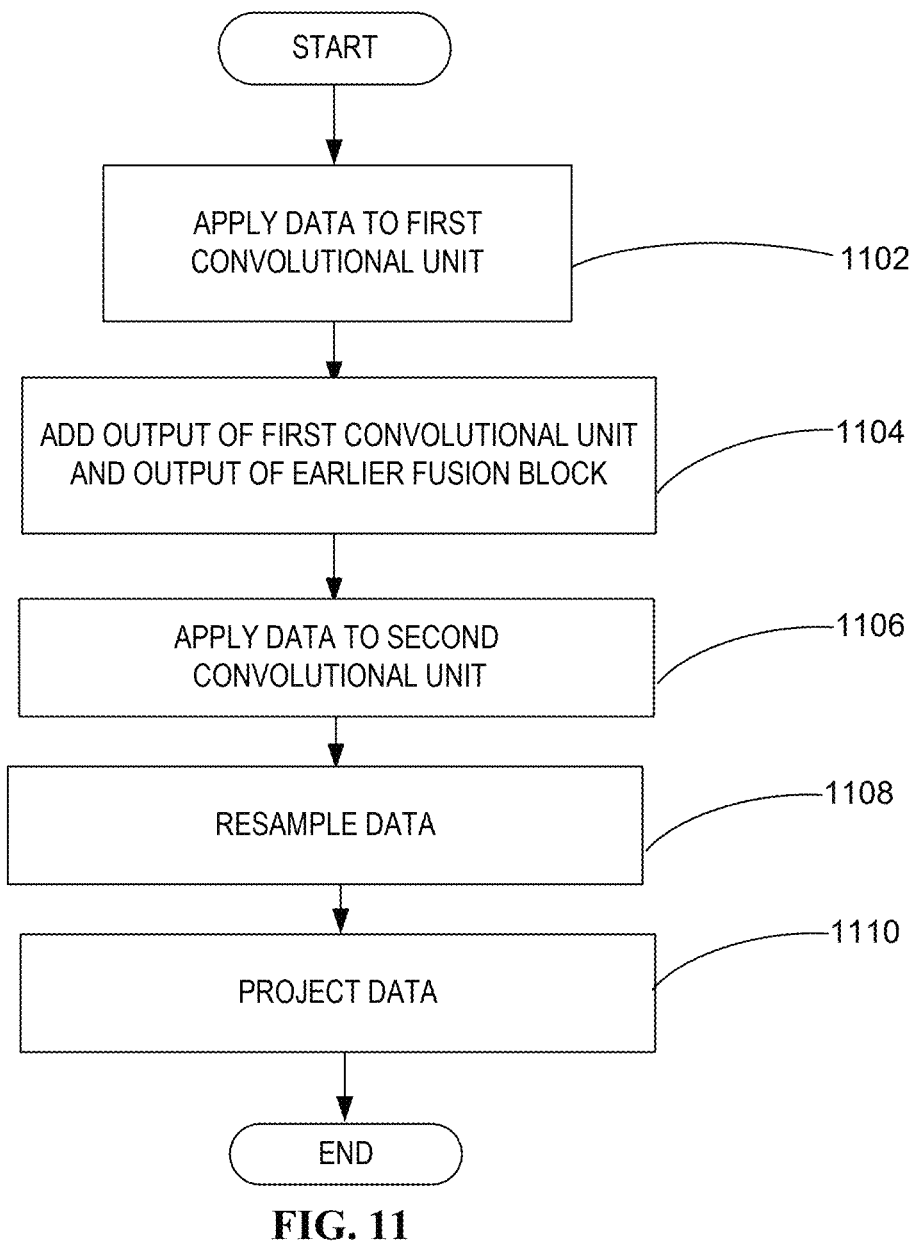
FIG. 11 is a flowchart representative of example machine readable instructions that may be executed by example processor circuitry to implement the fusion block of the dense predictor of FIG. 1.

FIG. 11 is a flowchart representative of example machine readable instructions and/or example operations 1100 that may be executed and/or instantiated by processor circuitry to fuse and upsample the tokens to generate the dense prediction. At a block 1102, the output of the one of the assemblers 106 is supplied to an input of a corresponding one of the fusion blocks 108 and operated on by an example first residual convolutional unit 402 of FIG. 4. At a block 1104, the example adder 404 adds the output of the first convolutional unit 420 to the output of an earlier fusion block 108 (not shown). At a block 1106, the second residual convolutional unit 406 operates on the output of the adder 404. At a block 1108, the data is resampled by the resampler$_{0.5}$ and, at a block 1110, the resampled data is projected by the projector 410. Thereafter, the method/operations/program instructions of flowchart 1100 end.

Figure 12:
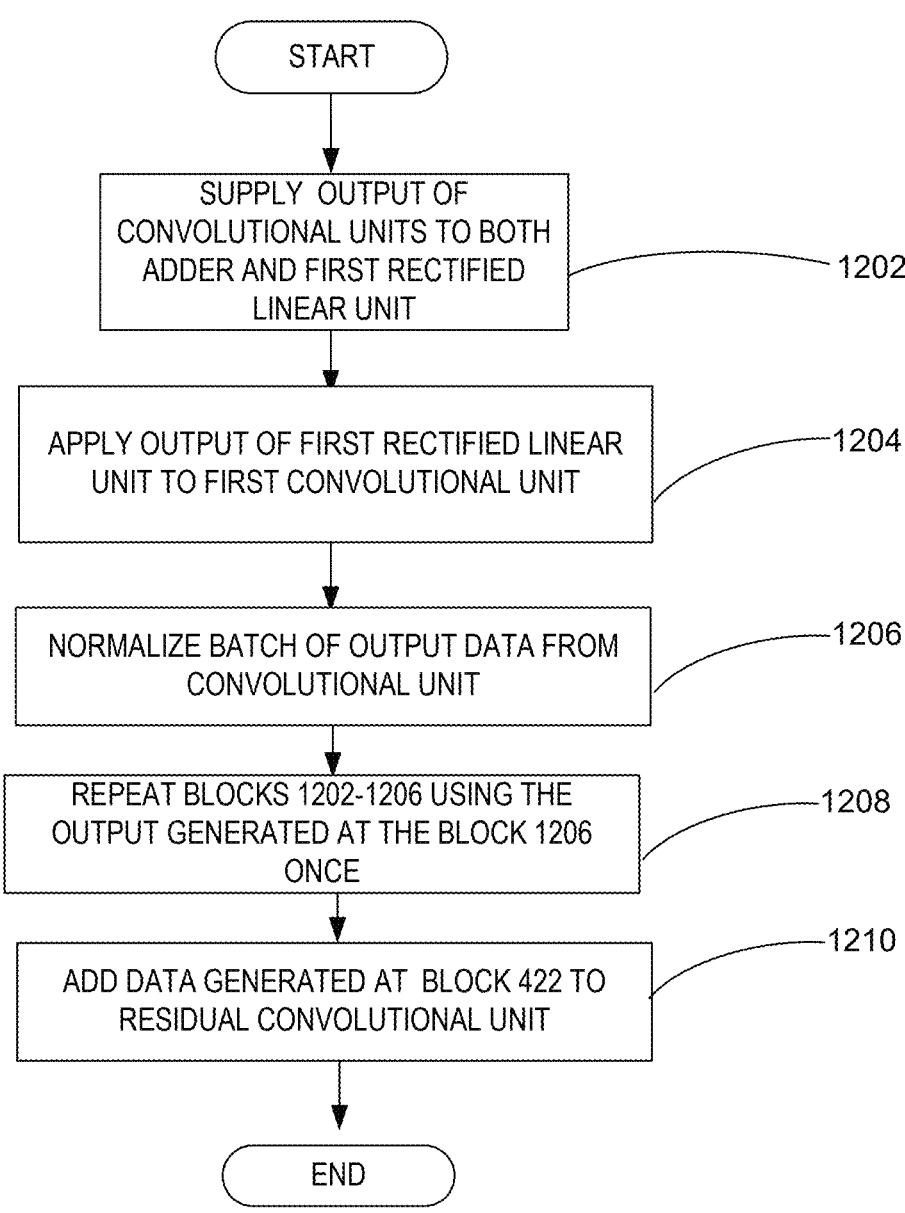
FIG. 12 is a flowchart representative of example machine readable instructions that may be executed by example processor circuitry to implement a residual convolutional unit of the fusion block of the dense predictor of FIG. 1.

FIG. 12 is a flowchart is representative of example machine readable instructions and/or example operations 1200 that may be executed and/or instantiated by processor circuitry to perform residual convolution within an example one of the fuse blocks 108. At a block 1202, the input supplied to the residual convolutional units 402, 406 is provided to both the example adder 424 and to the first rectified linear unit 412. At a block 1204, the output of the first rectified linear unit 412 is supplied to the example first convolutional unit (3×3) 414 and is then normalized by the first batch normalizer 416 (at a block 1206). Thereafter, the operations of blocks 412-416 are repeated by the blocks 418, 420, and 422, respectively. Lastly, the output of the second normalizer 422 is supplied to the adder 424 for addition to the input data set and then method/operation/program instructions represented by the flowchart 1200 end.

Figure 13:
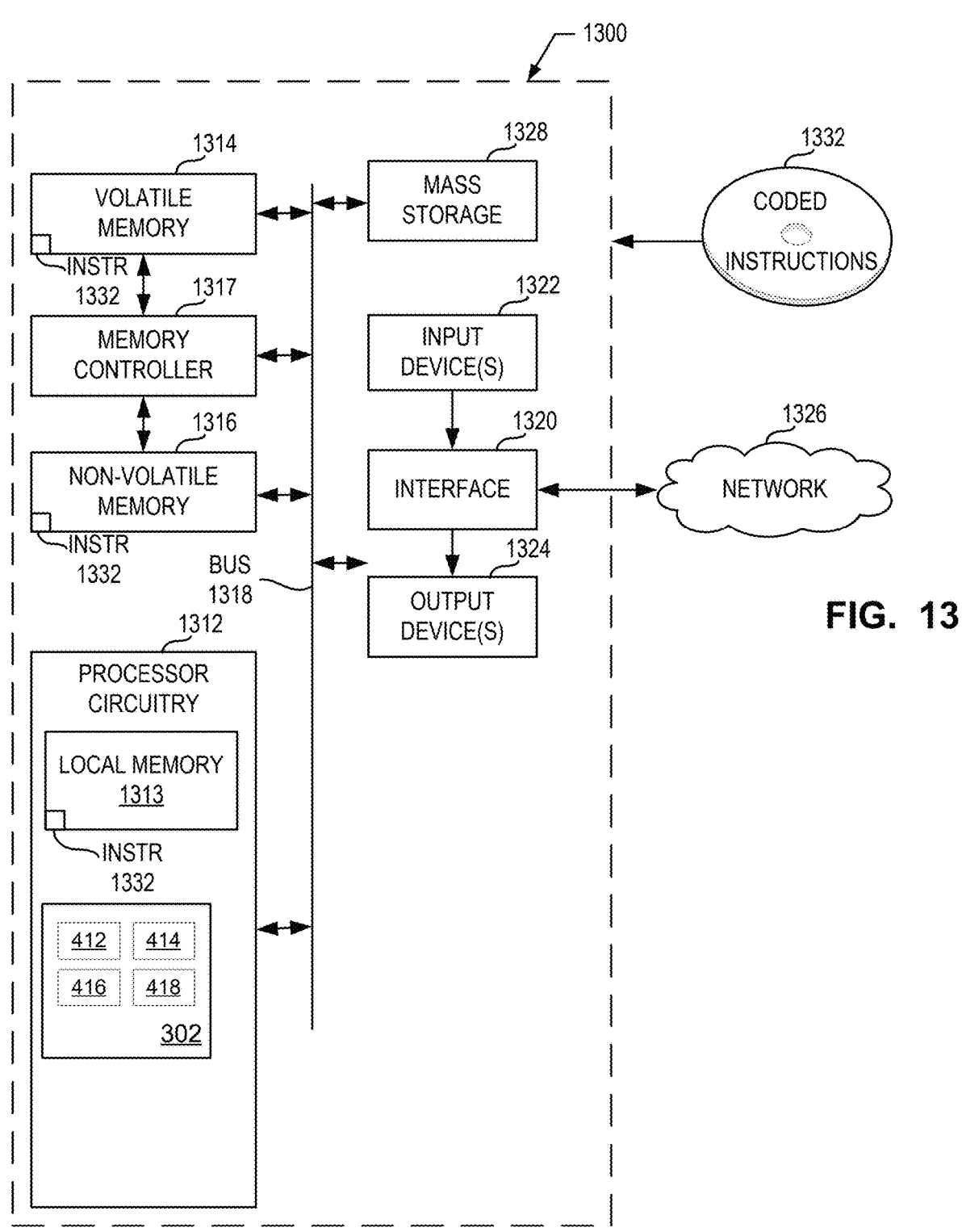
FIG. 13 is a block diagram of an example processing platform including processor circuitry structured to execute the example machine readable instructions of FIGS. 7-12 to implement the dense predictor of FIG. 1 and the individual components thereof.

FIG. 13 is a block diagram of an example processor platform 1300 structured to execute and/or instantiate the machine readable instructions and/or operations of FIGS. 7-12 to implement the image processing system 100 (also referred to as the dense predictor 100) of FIG. 1 and/or the components thereof illustrated in FIGS. 2-4. The processor platform 1300 can be, for example, a server, a personal computer, a workstation, a self-learning machine (e.g., a neural network), an Internet appliance, a DVD player, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example dynamic serializer 412, the dynamic initializer 414, and the example dynamic converter 418.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, redundant array of independent disks (RAID) systems, solid state storage devices such as flash memory devices, and DVD drives.

The machine executable instructions 1332, which may be implemented by the machine readable instructions of FIG. 500 may be stored in the mass storage device 1328, in the volatile memory 1314, in the non-volatile memory 1316, and/or on a removable non-transitory computer readable storage medium such as a CD or DVD.

Figure 14:
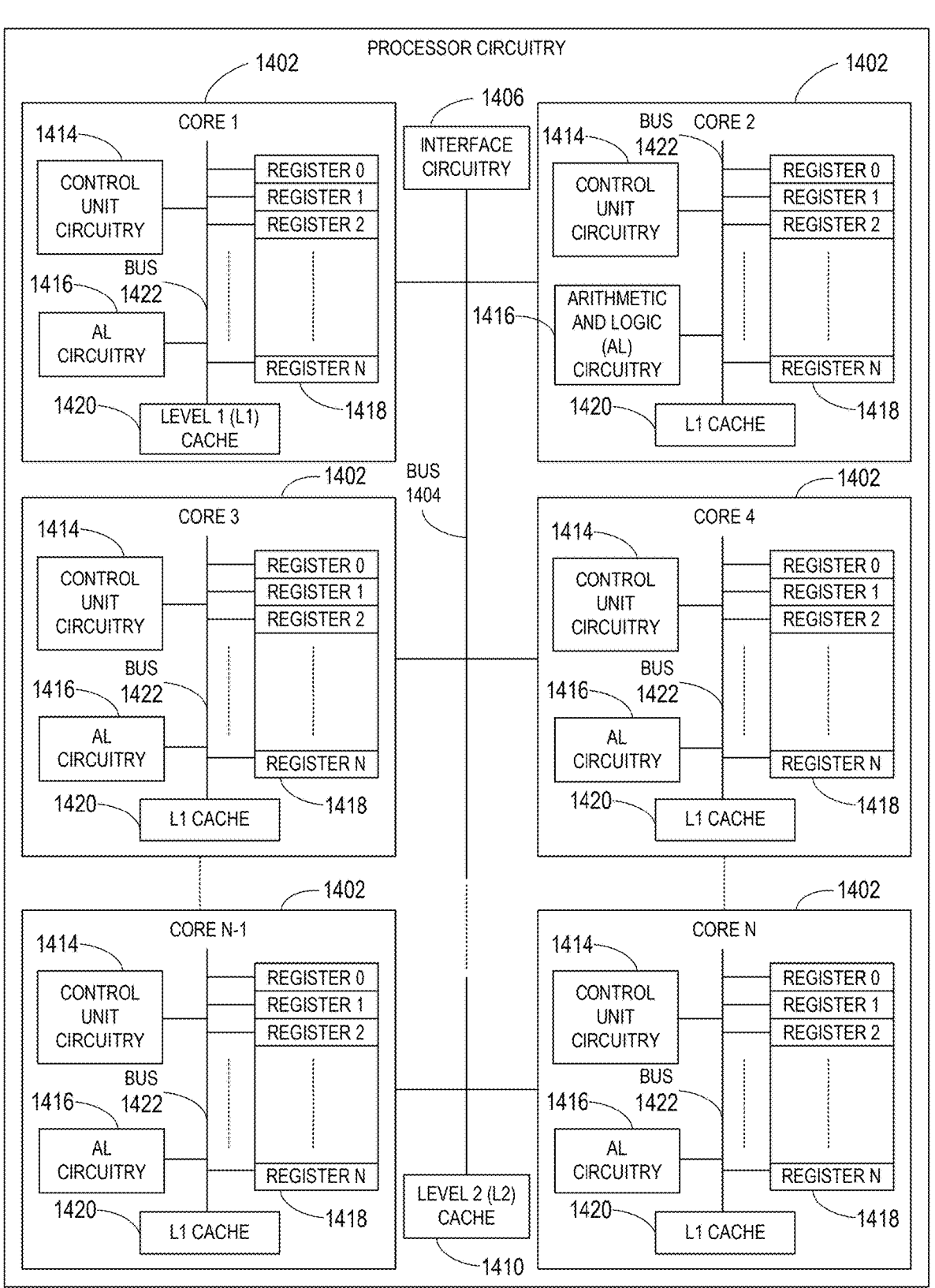
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may implement multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 7-12.

The cores 1402 may communicate by an example bus 1404. In some examples, the bus 1404 may implement a communication bus to effectuate communication associated with one(s) of the cores 1402. For example, the bus 1404 may implement at least one of an Inter-Integrated Circuit (I2C) bus, a Serial Peripheral Interface (SPI) bus, a PCI bus, or a PCIe bus. Additionally, or alternatively, the bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2_cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1404, arithmetic and logic (AL) circuitry (sometimes referred to as an ALU) 1416, a plurality of registers 1418, the L1 cache 1320, and an example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register (s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The bus 1420 may implement at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
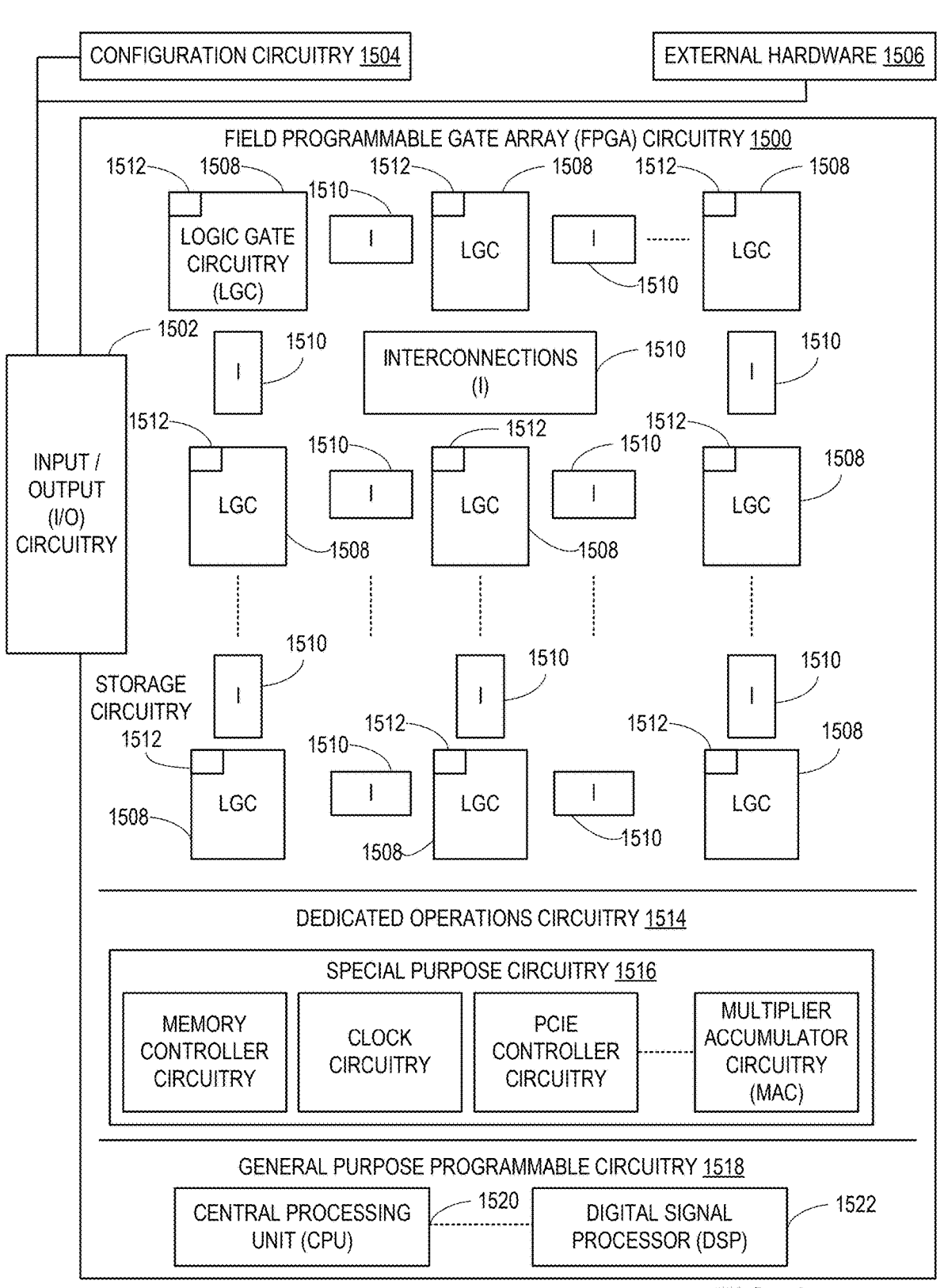
FIG. 15 is a block diagram of another example implementation of the processor circuitry of FIG. 13.

FIG. 15 is a block diagram of another example implementation of the processor circuitry 1310 of FIG. 13. In this example, the processor circuitry 1312 is implemented by FPGA circuitry 1500. The FPGA circuitry 1500 can be used, for example, to perform operations that could otherwise be performed by the example microprocessor 1312 of FIG. 13 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1310 of FIG. 13 described above (which is a general purpose device that may be programmed to execute some or all of the machine readable instructions represented by the flowcharts of FIGS. 7-12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 7-12. In particular, the FPGA 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some, or all of the software represented by the flowcharts of FIGS. 7-12. As such, the FPGA circuitry 1500 may be structured to effectively instantiate some or all of the machine readable instructions of the flowcharts of FIGS. 7-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIG. 15 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware (e.g., external hardware circuitry) 1506. For example, the configuration circuitry 1504 may implement interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may implement the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and interconnections 1510 are configurable to instantiate one or more operations that may correspond to at least some of the machine readable instructions of FIGS. 7-12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 7-12 may be executed by one or more of the cores 1402 of FIG. 14 and a second portion of the machine readable instructions represented by the flowcharts of FIGS. 7-12 may be executed by the FPGA circuitry 1500 of FIG. 15.

In some examples, the processor circuitry 1312 of FIG. 13 may be in one or more packages. For example, the processor circuitry 1400 of FIG. 14 and/or the FPGA circuitry 1500 of FIG. 9 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that perform dense prediction using a transformer. The disclosed systems, methods, apparatus, and articles of manufacture that leverage transformer blocks in the early stages of the networks in place of convolutions. In addition, the methods, apparatus, and articles of manufacture forego explicit down-sampling operations after an initial image embedding has been computed and maintain a representation with constant dimensionality throughout all processing stages. In addition, the dense predictor disclosed herein has a global receptive field (context) at every stage. These such properties are especially advantageous for dense prediction tasks as they lead to fine-grained and globally coherent predictions. Further, increased accuracy for dense prediction allows for the manufacture of higher quality products in various spaces (depth sensing, camera ISPs, autonomous driving, robotics).

Example methods, apparatus, systems, and articles of manufacture to perform dense prediction using transformer blocks are disclosed herein. Further examples and combinations thereof include the following:

Example 1 includes an apparatus comprising an encoder, comprising an embedder to convert an input image to a plurality of tokens, the plurality of tokens representing features extracted from the input image, and the embedder embedding the plurality of tokens with a learnable position, and a plurality of transformers configured in a sequence of stages relating each of the plurality of tokens to the other tokens, a decoder comprising a plurality of reassemblers associated with corresponding ones of the plurality of transformers, each of the plurality of reassemblers receiving an output from the corresponding one of the plurality of transformers, and assembling the tokens into feature representations, a plurality of fusion blocks to combine the feature representations to form a final feature representation, and an output head to generate a dense prediction based on the final feature representation and an output task.

Example 2 includes the apparatus of example 1, wherein the embedder is further to generate a special patch-independent token and add the special patch-independent token to the plurality of tokens.

Example 3 includes the apparatus of example 1, wherein the same number of tokens are maintained at each stage of the set of transformer stages.

Example 4 includes the apparatus of example 1, wherein the embedder is to divide the input image into non-overlapping patches of a same pixel size, flatten the patches into vectors, and individually embed the patches using a linear projection, the tokens to correspond to the embedded patches.

Example 5 includes the apparatus of example 1, wherein the reassemblers include a token reader to read the plurality of tokens, a concatenator to perform a spatial concatenation operation on an output of the token reader to generate an feature representation, and a resampler to scale the feature representation to a scalar height of the input image divided by a scalar and a width of the input image divided by the same scalar.

Example 6 includes the apparatus of example 1, wherein the reassemblers are to reassemble the tokens into feature representations from deeper stages of the transformer stages at a lower resolution, and assemble the tokens into feature representations from early stages of the transformer stages at a higher resolution.

Example 7 includes the apparatus of example 1, wherein the reassemblers are to place each token into a position occupied by each corresponding patch extracted from the input image, the tokens, when placed into the corresponding positions to form feature representations.

Example 8 includes an apparatus comprising a memory, instructions that when executed cause at least one processor to convert an input image to a plurality (N) of tokens, respective ones of the N tokens based on respective non-overlapping patches of the input image, the N tokens to include positional information, the positional information to identify respective positions in which the respective non-overlapping patches fit within the input image, reassemble the N tokens into feature representations after the tokens have passed through transformer stages, ones of the tokens output by deeper ones of the transformer stages assembled at a first resolution, ones of the tokens output by early ones of the transformer stages assembled at a second resolution, the first resolution lower than the second resolution, progressively fuse the feature representations using consecutive stages of a residual network, and, in each stage of the residual network, upsample a respective representation output by a respective stage of the residual network by a factor of two, and generate a dense prediction based on the fused feature maps.

Example 9 includes the apparatus of example 8, wherein the processor is further to generate a special patch-independent token and concatenate the special token to the N tokens.

Example 10 includes the apparatus of example 8, wherein the same number of tokens are maintained at each stage of the transformer stages.

Example 11 includes the apparatus of example 8, wherein the processor is further to divide the input image into the non-overlapping patches, the non-overlapping patches having a same number of pixels, flatten the N tokens into vectors, and apply a linear projection to the N tokens to embed the tokens.

Example 12 includes the apparatus of example 8, wherein to reassemble the N tokens the processor is to read the N tokens, spatially concatenate the N tokens to generate feature maps, and resample the feature maps to generate a scaled representation of the input image, the scaled representation having dimensions that are related to the input image by a scalar.

Example 13 includes the apparatus of example 8, wherein the reassemblers are to assemble the N tokens into feature representations generated at deeper ones of the transformer stages at a lower resolution, and assemble the N tokens into feature representations generated at earlier ones of the transformer stages at a higher resolution.

Example 14 includes a non-transitory computer readable medium comprising instructions that, when executed, cause a machine to at least convert an input image into tokens, the tokens to represent features extracted from the input image, and transform the tokens with information relating each token to all the other tokens, reassemble the transformed tokens into feature representations, progressively fuse the feature representations to a generate a final feature representation, progressively upsample the final feature representation by a factor of two, and generate a dense prediction based on the final feature representation.

Example 15 includes the non-transitory computer readable medium of example 14, wherein the instructions, when executed, cause the machine to generate a special patch-independent token and add the special patch-independent token to the tokens.

Example 16 includes the non-transitory computer readable medium of example 14, wherein the same number of tokens are maintained at each stage of a set of transformer stages used to transform the tokens.

Example 17 includes the non-transitory computer readable medium of example 14, wherein to convert the input image into tokens, the instructions, when executed, further cause the at least one machine to divide the input image into non-overlapping patches of a same pixel size, flatten the non-overlapping patches into vectors, and add spatial information to the non-overlapping patches to form the tokens.

Example 18 includes the non-transitory computer readable medium of example 14, wherein to reassemble the transformed tokens, the instructions, when executed, further cause the at least one machine to read the plurality of transformed tokens to generate read information, spatially concatenate read information, and scale the final feature representation to a first height and a first width, the first height and the first width related to a second height and a second width, respectively, by a scalar, and the second height and the second width corresponding to a size of the input image.

Example 19 includes the non-transitory computer readable medium of example 14, wherein to reassemble the tokens, the instructions, when executed, further cause the at least one machine to reassemble the tokens from deeper stages of the transformer stages at a lower resolution, and reassemble the tokens from early stages of the transform stages at a higher resolution.

Example 20 includes a method comprising converting, by executing an instruction with at least one processor, an input image into tokens, the tokens to represent features extracted from the input image, and transforming, by executing an instruction with the at least one processor, the tokens to include information relating each token to all the other tokens, reassembling, by executing an instruction with the at least one processor, the transformed tokens into feature representations, the transformed tokens output from respective ones of a plurality of transformer stages, progressively fusing, by executing an instruction with the at least one processor, the feature representations to a generate a final feature representation, progressively, by executing an instruction with the at least one processor, upsampling the feature representations by a factor of two, and generating, by executing an instruction with the at least one processor, a dense prediction based on the final feature representation.

Example 21 includes the method of example 20, further including generating a special patch-independent token, and adding the special patch-independent token each of the tokens.

Example 22 includes the method of example 20, wherein a same number of tokens are maintained at each stage of a set of transformer stages used to transform the tokens.

Example 23 includes the method of example 20, further including dividing the input image into non-overlapping patches of a same pixel size, flattening the non-overlapping patches into vectors, and embedding the non-overlapping patches using a linear projection.

Example 24 includes the method of example 20, wherein reassembling the transformed tokens includes reading the plurality of transformed tokens to generate read information, spatially concatenating the read information to form a final feature, and scaling the final feature representation to a first height and a first width, the first height and the first width related to a second height and a second width, respectively, by a scalar, and the second height and the second width corresponding to a size of the input image.

Example 25 includes the method of example 20, wherein reassembling the tokens further includes reassembling the tokens from deeper stages of the transformer stages at a lower resolution, and reassembling the tokens from early stages of the transform stages at a higher resolution.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for assigning labels to pixels of an image, the apparatus comprising:

an embedder to generate a plurality of embedded tokens from the image;

one or more transformers to process the plurality of embedded tokens through a plurality of transformer stages, wherein an output of a first transformer stage is used as an input of a second transformer stage; and a fusion block, wherein the fusion block comprises:

a first convolution unit, the first convolution unit to generate a first feature map based on a feature representation corresponding to an output of the first transformer stage, an adder, the adder to receive the first feature map from the first convolution unit, to receive a second feature map corresponding to an output of the second transformer stage, and to generate an output by adding the first feature map with the second feature map, and a second convolution unit, the second convolution unit to process the output of the adder.

2. The apparatus of claim 1, wherein the embedder comprises a convolutional neural network to apply to the image.

3. The apparatus of claim 1, wherein the second feature map is generated by another fusion block from another feature representation corresponding to the output of the second transformer stage.

4. The apparatus of claim 1, wherein a transformer comprises a multi-head self-attention block.

5. The apparatus of claim 4, wherein the transformer further comprises a plurality of normalizers and adders.

6. The apparatus of claim 1, wherein the decoder comprises-a reassembler, is coupled with the fusion block, wherein the feature representation is generated by the reassembler from the output of the first transformer stage.

7. The apparatus of claim 1, wherein the labels identify at least one category associated with the pixels in the image.

8. One or more non-transitory machine-readable media having instructions stored thereon, the instructions executable by a machine to implement:

an embedder to generate a plurality of embedded tokens from the image;

one or more transformers to process the plurality of embedded tokens through a plurality of transformer stages, wherein an output of a first transformer stage is used as an input of a second transformer stage; and a fusion block, wherein the fusion block comprises:

a first convolution unit, the first convolution unit to generate a first feature map based on a feature representation corresponding to an output of the first transformer stage, an adder, the adder to receive the first feature map from the first convolution unit, to receive a second feature map corresponding to an output of the second transformer stage, and to generate an output by adding the first feature map with the second feature map, and a second convolution unit, the second convolution unit to process the output of the adder.

9. The one or more non-transitory machine-readable media of claim 8, wherein the embedder comprises a convolutional neural network to apply to the image.

10. The one or more non-transitory machine-readable media of claim 8, wherein the second feature map is generated by another fusion block from another feature representation corresponding to the output of the second transformer stage.

11. The one or more non-transitory machine-readable media of claim 8, wherein a transformer comprises a multi-head self-attention block.

12. The one or more non-transitory machine-readable media of claim 11, wherein the transformer further comprises a plurality of normalizers and adders.

13. The one or more non-transitory machine-readable media of claim 8, wherein a reassembler is coupled with the fusion block, wherein the feature representation is generated by the reassembler from the output of the first transformer stage.

14. The one or more non-transitory machine-readable media of claim 8, wherein the instructions are executable by the machine to further implement a head, the head to assign labels to pixels of the image based on an output of the decoder, the labels identifying at least one category associated with the pixels in the image.

15. A computing device comprising:
a camera to capture an image;
a memory to store instructions; and
a processor coupled to the memory to execute the instructions to implement:
    an embedder to generate a plurality of embedded tokens from the image,
    one or more transformers to process the plurality of embedded tokens through a plurality of transformer stages, wherein an output of a first transformer stage is used as an input of a second transformer stage, and a fusion block, wherein the fusion block comprises:
    a first convolution unit, the first convolution unit to generate a first feature map based on a feature representation corresponding to an output of the first transformer stage,
    an adder, the adder to receive the first feature map from the first convolution unit, to receive a second feature map corresponding to an output of the second transformer stage, and to generate an output by adding the first feature map with the second feature map, and
    a second convolution unit, the second convolution unit to process the output of the adder.

16. The computing device of claim 15, wherein the embedder comprises a convolutional neural network to apply to the image.

17. The computing device of claim 15, wherein the second feature map is generated by another fusion block from another feature representation corresponding to the output of the second transformer stage.

18. The computing device of claim 15, wherein a transformer comprises a multi-head self-attention block.

19. The computing device of claim 18, wherein the transformer further comprises a plurality of normalizers and adders.

20. The computing device of claim 15, wherein a reassembler is coupled with the fusion block, wherein the feature representation is generated by the reassembler from the output of the first transformer stage.

21. The computing device of claim 15, wherein the processor is to execute the instructions to further implement a head, the head to assign labels to pixels of the image based on an output of the decoder, the labels identifying at least one category associated with the pixels in the image.

* * * * *